(12) United States Patent
Perelli et al.

(10) Patent No.: US 10,198,039 B2
(45) Date of Patent: Feb. 5, 2019

(54) MULTIPLE DISPLAY DEVICE

(71) Applicant: Lenovo (Singapore) Pte. Ltd., Singapore (SG)

(72) Inventors: Thomas Perelli, Raleigh, NC (US); Ali Kathryn Ent, Raleigh, NC (US); Cuong Huy Truong, Cary, NC (US); Gerard Francis Muenkel, Raleigh, NC (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 0 days.

(21) Appl. No.: 15/396,502

(22) Filed: Dec. 31, 2016

(65) Prior Publication Data

US 2018/0188773 A1    Jul. 5, 2018

(51) Int. Cl.
| | | |
|---|---|---|
| *G06F 3/033* | (2013.01) | |
| *G06F 1/16* | (2006.01) | |
| *G06F 3/0354* | (2013.01) | |
| *G06F 3/0486* | (2013.01) | |
| *G06F 3/0481* | (2013.01) | |

(52) U.S. Cl.
CPC ............ *G06F 1/165* (2013.01); *G06F 1/1616* (2013.01); *G06F 1/1649* (2013.01); *G06F 1/1662* (2013.01); *G06F 1/1681* (2013.01); *G06F 3/03543* (2013.01); *G06F 3/0486* (2013.01); *G06F 3/04817* (2013.01)

(58) Field of Classification Search
CPC ...... G06F 1/165; G06F 1/1616; G06F 1/1637; G06F 1/1647; G06F 1/1649; G06F 1/1654; G06F 1/166; G06F 1/1662; G06F 1/1681; G06F 1/1698; G06F 3/0213; G06F 3/03543; G06F 3/04817; G06F 3/0486; H04M 1/0206; H04M 1/0216; H04M 2250/22

See application file for complete search history.

(56) References Cited

U.S. PATENT DOCUMENTS

| | | | |
|---|---|---|---|
| 2002/0039276 A1 | 4/2002 | Kaneko | |
| 2003/0201915 A1* | 10/2003 | Anderson, Jr. | G06F 3/0202 341/22 |
| 2004/0061997 A1* | 4/2004 | Skinner | G06F 1/1616 361/679.55 |
| 2004/0069117 A1* | 4/2004 | Akins | G06F 1/1607 84/486 |
| 2004/0264126 A1 | 12/2004 | Wells | |
| 2006/0176277 A1* | 8/2006 | Daniel | G06F 3/0317 345/163 |
| 2010/0039764 A1* | 2/2010 | Locker | G06F 1/1615 361/679.29 |

(Continued)

OTHER PUBLICATIONS

United States Department of Labor, Computer Workstations eTool, accessed Jun. 15, 2017 (3 pages).

(Continued)

*Primary Examiner* — Michael J Eurice
(74) *Attorney, Agent, or Firm* — Brian J. Pangrle

(57) ABSTRACT

An apparatus can include a processor; memory accessible by the processor; a first housing that includes a first display operatively coupled to the processor; a second housing that includes a keyboard, a second display and a detachable pointing device adjacent to the second display; and a hinge assembly that operatively couples the first housing to the second housing.

19 Claims, 25 Drawing Sheets

(56) References Cited

U.S. PATENT DOCUMENTS

| | | | |
|---|---|---|---|
| 2012/0092253 A1 | 4/2012 | Irani | |
| 2012/0327580 A1* | 12/2012 | Gengler | G06F 1/1626 |
| | | | 361/679.09 |
| 2013/0027364 A1 | 1/2013 | Kim | |
| 2013/0050090 A1* | 2/2013 | Stewart | G06F 3/04886 |
| | | | 345/168 |
| 2014/0310643 A1 | 10/2014 | Karmanenko | |
| 2015/0116362 A1* | 4/2015 | Aurongzeb | G06F 3/1446 |
| | | | 345/650 |
| 2015/0277509 A1* | 10/2015 | Probst | G06F 1/1616 |
| | | | 361/679.12 |
| 2015/0370339 A1* | 12/2015 | Ligtenberg | G06F 1/1662 |
| | | | 345/168 |
| 2016/0091929 A1* | 3/2016 | Kwong | G06F 1/1639 |
| | | | 345/173 |
| 2016/0259375 A1* | 9/2016 | Andre | G06F 1/1656 |
| 2017/0358275 A1 | 12/2017 | Klement | |

OTHER PUBLICATIONS

Tech E Blog, Feno: The Foldable Notebook Computer with a Pop-Out Mouse, May 3, 2011 (5 pages).
Lenovo Dual Mode Wireless Touch Mouse N700, Manual, Jul. 2013 (100 pages).
Laptop Magazine, 10 Technologies That Need to Make a Comeback, The HP Pop-Out Mouse, Apr. 8, 2011 (10 pages).

* cited by examiner

MULTIPLE DISPLAY DEVICE

TECHNICAL FIELD

Subject matter disclosed herein generally relates to technology for computing or other devices.

BACKGROUND

Various types of devices, display devices, computing and display devices, etc. exist where, for example, a hinge assembly allows for orienting one portion with respect to another portion. For example, a display portion may be oriented with respect to a keyboard portion.

SUMMARY

An apparatus can include a processor; memory accessible by the processor; a first housing that includes a first display operatively coupled to the processor; a second housing that includes a keyboard, a second display and a detachable pointing device adjacent to the second display; and a hinge assembly that operatively couples the first housing to the second housing. An apparatus can include a processor; memory accessible by the processor; a first housing that includes a first display operatively coupled to the processor and a transparent window; a second housing that includes a keyboard and a second display; and a hinge assembly that operatively couples the first housing to the second housing to transition from a closed, clamshell orientation to an open, clamshell orientation wherein, in the closed, clamshell orientation, the transparent window overlays at least a portion of the second display. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

Figure 1:
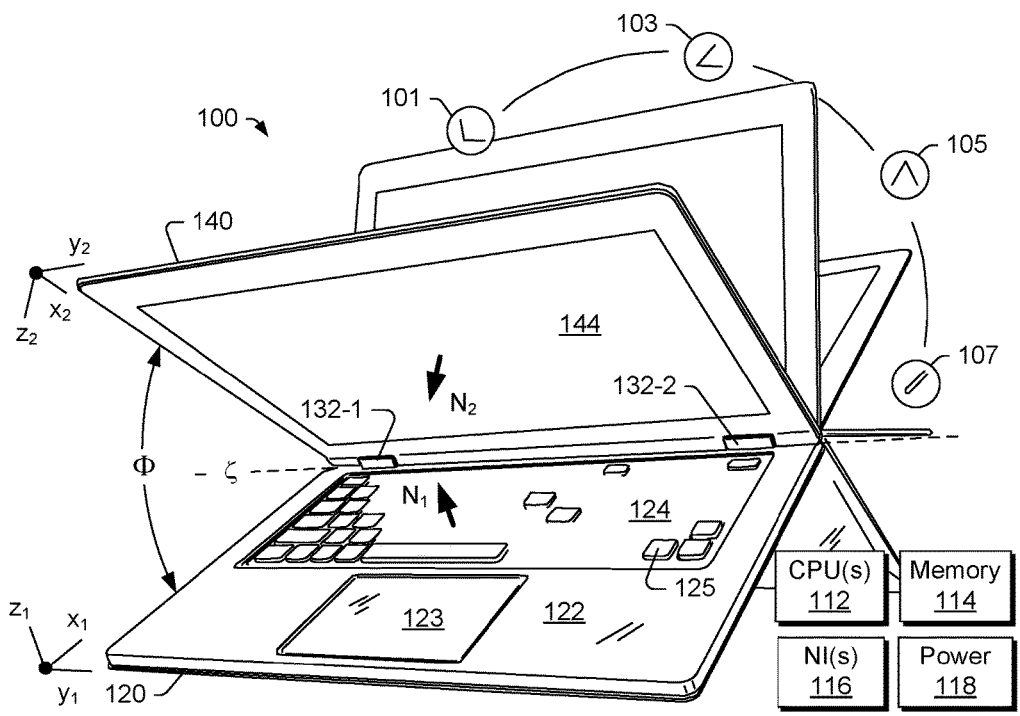
FIG. 1 is a diagram of an example of a device.
Figure 1:
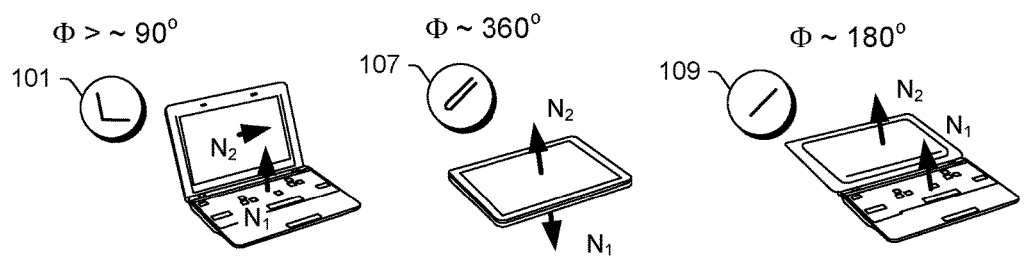

FIG. 1 shows an example of a device 100 that includes a keyboard housing 120 and a display housing 140 that are pivotable with respect to each other via movement about one or more hinges 132-1 and 132-2 (e.g., hinge assemblies). The device 100 may be a device such as, for example, a computing device (e.g., an information handling device).

As an example, the device 100 may include one or more processors 112, memory 114 (e.g., one or more memory devices), one or more network interfaces 116, and one or more power cells 118. Such components may be, for example, housed with the keyboard housing 120, the display housing 140, or the keyboard housing 120 and the display housing 140.

As shown in the example of FIG. 1, the keyboard housing 120 includes a keyboard 124 with keys 125 and the display housing 140 includes a display 144. In such an example, the keyboard 124 is defined in a first Cartesian coordinate system as having a depth along an x-axis ($x_1$), a width along a y-axis ($y_1$) and a height or thickness along a z-axis ($z_1$) that extends in a direction outwardly away from touch surfaces of keys 125 of the keyboard 124 and the display 144 is defined in a second Cartesian coordinate system as having a depth along an x-axis ($x_2$), a width along a y-axis ($y_2$) and a height or thickness along a z-axis ($z_2$) that extends in a direction outwardly away from a viewing surface of the display 144. As an example, a coordinate system may be right-handed or left-handed.

As shown in the example of FIG. 1, the one or more hinges 132-1 and 132-2 pivotably connect the keyboard housing 120 and the display housing 140 for orienting the display housing 140 with respect to the keyboard housing 120. For example, orientations may include orientations definable with respect to an axis (e.g., or axes) such as the axis $\zeta$ and an angle $\Phi$ about that axis.

FIG. 1 shows some examples of orientations 101, 103, 105, 107 and 109. The orientations 101, 103, 105, 107 and 109 may correspond to orientations of a clamshell computing device. The orientation 101 may be a notebook orientation where the angle Φ is about 90 degrees or more (e.g., or optionally somewhat less than about 90 degrees depending on position of a user, etc.). As shown, for the orientation 101, a user may use a finger or fingers of one or both hands to depress keys 125 of the keyboard 124 (e.g., touch typing), for example, while viewing information being rendered to the display 144 of the display housing 140 (e.g., using the one or more processors 112, the memory 114, etc. that may be included in the keyboard housing 120, the display housing 140 or both).

As an example, the keyboard housing 120 may include a frontal surface 122 and may include a touch input surface 123 (e.g., of a touch input device such as a touchpad). As an example, the keyboard 124 may include one or more other input devices (e.g., a control stick, etc.). As an example, the frontal surface 122 may be a surface suitable for resting a palm or palms of a hand or hands. For example, as shown in FIG. 1, the touch input surface 123 can be defined by x and y dimensions where a left palm rest surface is to the left of the touch input surface 123 and where a right palm rest surface is to the right of the touch input surface 123. In such an example, the left and right palm rest surfaces may be defined by respective x and y dimensions as well as a spacing therebetween. Where a device does not include a touch input surface such as the touch input surface 123, the frontal surface 122 may extend in the y direction approximately from a left side of the keyboard housing 120 to a right side of the keyboard housing. Such a surface can be a left and right palm rest surface.

A palm rest surface can allow a user to rest a palm or palms while the user may type (e.g., touch type) using keys of a keyboard that is part of a keyboard housing. For example, a user can rest a palm on a palm rest surface while using one or more finger tips (e.g., or finger pads) to touch keys to thereby instruct a computing device to receive input instructions. In such an example, the keys of the keyboard may be depressible keys. A depressible key may include a spring mechanism that allows the key to be, responsive to finger applied force, depressed a distance in the z direction of the Cartesian coordinate system of a keyboard housing to a level that may be a maximum depression level where, upon release of the force, the key may then return to an undepressed level.

As to the orientation 103, it may correspond to a display orientation for viewing the display 144 where the keyboard 124 faces downward and the device 100 is supported by the keyboard housing 120 (e.g., by a rim about the keyboard 124, the frontal surface 122, etc.). As to the orientation 105, it may correspond to a "tent" orientation where the display 144 faces outwardly for viewing on one side of the tent and the keyboard 124 of the keyboard housing 120 faces outwardly on the other side of the tent.

The orientation 107 may be a tablet orientation where the angle Φ is about 360 degrees such that a normal outward vector $N_1$ of the keyboard 124 of the keyboard housing 120 and a normal outward vector $N_2$ of the display 144 of the display housing 140 are oriented in oppositely pointing directions, pointing away from each other; whereas, in contrast, for a closed orientation of the device 100 (e.g., where the angle Φ is about 0 degrees), the vectors $N_1$ and $N_2$ would be pointing toward each other.

In the orientation 107, the keyboard 124 has its keys 125 pointing outwardly in the direction of the vector $N_1$. Where the keys 125 are depressible keys, when a user grasps the device 100, the keys 125 may be contacted by the users hand or hands. A user may perceive the springiness of the keys 125 as being somewhat undesirable. For example, springy keys may interfere with a user's ability to comprehend or sense force that is sufficient to grasp the device 100, which may cause the user to grasp too lightly or to grasp too strongly, which may possibly impact integrity of the keys (e.g., springs, spring-mechanisms, contacts, etc.). Further, if the user repositions her hand or hands, the user may experience the springiness again. In contrast, a surface without such depressible keys may have a more even feel to a user and may be less distracting. An arrangement that allows for such a surface may include a single hinge that allows for pivoting a keyboard housing with respect to a display housing such that keys of the keyboard housing can be oriented to face a back side of a display. In such an approach, a user may spin the keyboard housing by 180 degrees about a central axis of the single hinge (e.g., an axis orthogonal to the axis ζ) and then rotate the keyboard housing such that the keys face the back side of the keyboard in a folded orientation. In such an example, a single centrally located hinge provides symmetry such that a computing device can be aligned in a clamshell closed orientation and a tablet orientation, optionally with the keys of the keyboard housing facing the back side of a display of a display housing.

The orientation 109 may be a planar orientation where the angle Φ is about 180 degrees such that a normal outward vector $N_1$ of the keyboard 124 of the keyboard housing 120 and a normal outward vector $N_2$ of the display 144 of the display housing 140 are oriented in approximately the same pointing directions.

Various computing devices such as laptop or notebook computing devices can be characterized at least in part by a footprint. For example, the device 100 of FIG. 1 may be characterized at least in part by dimensions in x and y as to the keyboard housing 120 and/or as to the display housing 140. As an example, a footprint can be an area that can be defined by a plane in the x and y directions of the Cartesian coordinate systems shown in FIG. 1.

As an example, a user of a laptop computer (e.g., a laptop) with a single display may toggle between graphical user interfaces of one or more applications to perform various tasks, for example, to manage multiple documents, to get to emails, to access a calculator, to view and/or write electronic sticky notes, etc. Toggling by touchscreen, touchpad, mouse, voice command, etc., can distract from a user's workflow.

As an example, a user of laptop computer (e.g., a laptop) may not be fully satisfied with its touchpad, track-point mouse, etc. Such a user may rely on another pointing device such as a separate touchpad, a separate mouse, etc., which may be wired or wireless and paired electronically for communication with the laptop computer (e.g., consider BLUETOOTH® pointing devices, etc.). For transport, the user may maintain multiple separate devices (e.g., a mouse at home, a mouse at work) and may have to transport one or more of those separate devices when traveling away from home or away from work. Such separate device or devices are at risk of being forgotten (e.g., left at home or left at work) and, when not forgotten, take up space in a user's bag, luggage, etc.

As an example, a laptop computer, as a type of device, can include a mini-display as a secondary display and/or can include a removable mouse (e.g., a removable pointing device). As an example, a device can include a mini-display that is operatively coupled to circuitry of the device (e.g., one or more processors, one or more microcontrollers, etc.).

In such an example, the device can render information to the mini-display, for example, optionally in a manner independent of rendering of information to a main display of the device. As an example, a mini-display may be a touchscreen display that includes one or more types of touch sensitive circuitry (e.g., capacitive touch, infrared sensor touch sensing, etc.). As an example, a device can include, optionally as part of a mini-display, wireless communication circuitry that can be operatively coupled to wireless communication circuitry of another device and/or network service such as, for example, a mobile phone, a global positioning system device, a wireless access point device, a router, a camera (e.g., still and/or video), a streaming audio information device (e.g., a home audio system, etc.), a weather service, a stock market information service, an emergency alert service, a home security service, etc. In such examples, the mini-display can render information associated with one or more other devices and/or information received via a network or networks in a manner that does not alter information being rendered to a main display of the device.

As an example, a mini-display may include panels where each panel can be assigned to a device and/or a service. For example, one panel may be assigned to a smartphone, another panel may be assigned to a weather service and yet another panel may be assigned to a text messaging account.

As an example, a device with a main display and a mini-display can allow a user to perform various tasks (e.g., workflow or workflows) using the main display while information may be rendered to the mini-display where such information may or may not be related to one or more of the various tasks. For example, where the device is operatively coupled to a user's smartphone, the mini-display may render call information, email information, text messaging information (e.g., instant messenger, etc.), etc. to the mini-display as associated with one or more accounts of the user's smartphone, which may differ from one or more accounts of the user's device (e.g., a laptop computer). Where the user's device is a work device, the smartphone and the device may be kept independent as to accounts (e.g., a work email and a personal email) while the user can still view information received via such accounts while performing various tasks (e.g., viewing work email on the main display and viewing personal email on the mini-display).

As an example, a mini-display may be designed for rendering a single line of information. For example, a mini-display may be a single text line display. As an example, a mini-display may be designed for rendering multiple lines of information and/or graphics.

As an example, a mini-display may be a rule display. As an example, a mini-display may be a notification display.

As an example, a mini-display can be positioned above a keyboard, for example, positioned between the keyboard and a main display where the keyboard may be part of a keyboard housing and the main display may be part of a main display housing. As an example, a mini-display may be recessed into a keyboard housing. As an example, a mini-display may be tiltable with respect to a keyboard housing. As an example, a mini-display may be part of a hinge assembly that operatively couples a keyboard housing to a main display housing. As an example, a keyboard housing and/or a main display housing may include a transparent window through which a mini-display or mini-displays may be visible. As an example, a mini-display may be a two sided display and/or two mini-displays, where one mini-display may face one direction and another mini-display may face another direction such that, for example, one is visible via a transparent window of a main display housing and/or one is visible via a transparent window of the keyboard housing.

As an example, a device can include a removable keyboard that has a keyboard side and a display side. For example, a keyboard housing of a laptop computer can include a removable tablet that includes a keyboard side and a display side. In such an example, a user may orient the removable tablet with the keyboard facing upward and the display facing downward for use in touch typing or may orient the removable tablet with the display facing upward and the keyboard facing downward such that the device has two visible displays, a main display of a main display housing and the removable tablet display. In such an example, the two displays may optionally be operated in landscape mode and/or portrait mode. For example, consider a book mode where the two displays render information in portrait mode and where a user can navigate the information akin to pages of a book, where a hinge end of the device is akin to a binding of the book. As another example, consider a tent mode, where one display is facing a user and the other display is facing another person. Such a mode may allow for mirroring, independent operation of the two displays by the two individuals and/or cooperative operation of the two displays by the two individuals (e.g., for playing a game, etc.). As an example, a removable keyboard that includes a keyboard side and a display side can include a touchscreen display such that the display side can be suitably used for touch input.

As an example, a removable keyboard that includes a keyboard side and a display side may be removable from a device (e.g., a keyboard housing) and utilized independent of the device and/or utilized in a manner that depends on circuitry of the device (e.g., via wire or wireless). For example, the device may be a wireless access point for the removable keyboard where the device and the removable keyboard include wireless communication circuitry (e.g., WiFi, BLUETOOTH®, etc.).

As an example, a device may include a mini-display and a removable keyboard that includes a keyboard side and a display side. As an example, a keyboard housing of a device that includes a removable keyboard with a keyboard side and a display side (e.g., a removable tablet) may include a transparent window in a keyboard housing and/or a transparent window in a main display housing. As an example, where a device includes a keyboard housing with a transparent window, a removable keyboard with a display side may allow for viewing at least a portion of the display side through the transparent window. For example, a portion of a display of the display side of the removable keyboard can be utilized for notifications, etc. and be visible through the transparent window of the keyboard housing (e.g., in a closed clamshell orientation of the device).

As mentioned, a mini-display may be just above a keyboard of a device and may, for example, be linked via wireless circuitry and appropriate wireless communication protocol(s) to another device such as a cell phone. Such a mini-display can provide a quick and easy access to notifications, such as emails, text, weather alerts, etc. from both inside the laptop and outside when it is closed where the device includes a transparent window in its main display housing. In such an example, frequent, everyday information may be rendered to the mini-display to avoid having such information taking space on a main display. As an example, a replication mode may be implemented where information rendered to the mini-display is replicated to the main display, for example, to provide for rendering of more lines of text, etc. As an example, a switch mode may be implemented where an application may be called up and rendered to the main display where one or more of a notification, tool(s), menu(s), button(s), etc., for that application has been rendered to the mini-display. For example, where an email notification is rendered to the mini-display, a touch of the mini-display may cause an email application to be instantiated or otherwise opened and rendered to the main display such that a user can readily read and/or respond to the corresponding email.

As an example, where an application executing in an operating system environment of a device calls for rendering of a menu or toolbar to the main display, a user may drag and drop the menu or toolbar to a mini-display or, for example, set a preference to render the menu or toolbar to the mini-display. In such an example, where a user is concerned with information rendered to the main display, the menu or toolbar does not need to take space on that main display. For example, consider a photo editing application where a photo may be rendered to the main display and one or more menu items, one or more tools, etc. may be selected from the mini-display. As to a drag and drop action, a user may utilize a mouse or other pointing device (e.g., optionally a finger) and select a menu or toolbar and move it downward to an edge of the main display such that the device is triggered to re-render the menu or toolbar to the mini-display. As another example, a mini-display icon may be rendered to the main display where a menu or toolbar or other information may be dragged and dropped onto the mini-display icon to trigger a device to re-render that menu, toolbar, etc., to the mini-display. As yet another example, a user may right click on a graphic, etc. (e.g., a menu, toolbar, etc.) rendered to a main display and an option may appear in a pop-out menu to re-render that graphic, etc. to the mini-display.

As an example, a laptop computer can include a main display and a mini-display that functions to render information from another device akin to a heads-up display for that other device such that a user need not have to reach and actuate the other device (e.g., consider a smartphone, etc.).

As an example, a multi-display device can include one or more transparent windows that can allow a user to access various types of information when the device is closed (e.g., in a clamshell orientation). As an example, a mini-display of a multi-display device can be seen through a main display housing, which may be via a transparent window either at the top surface or along an edge. As an example, a person could have her hands full and get a text from her doctor saying that her appointment has been canceled. In such an example, the information is right in front of the person without having to get out her smartphone (e.g., from a pocket, a purse, a belt clip, etc.). In such an example, the smartphone may be utilized for one or more other tasks, for example, consider rendering audio to one or more earbuds in the person's ear or ears. In such an example, the person may continue to enjoy listening to the audio without having to access the smartphone (e.g., consider listening to music via the smartphone on a busy street corner and being able to view a notification generated by the smartphone and rendered to the mini-display).

As mentioned, a mini-display may be tiltable and/or may be tiltable with a removable mouse. For example, a mini-display with a removable mouse can be tilted up for optimal viewing angle, which may occur automatically and/or manually. For example, a hinge may upon transitioning a device from a clamshell to a laptop mode orient a mini-display and/or a removable mouse at an angle that may be measured as an angle from a plane of a keyboard housing of the device.

As an example, a mini-display may access information from a laptop computer (e.g., via an interface of the mini-display being operatively coupled to an interface of the laptop computer), for example, one or more purposes (e.g., emails, electronic sticky notes, FaceTime video, etc.). As an example, a mini-display may be wired to circuitry of a main display housing and/or circuitry of a keyboard housing. As an example, a mini-display can include a power interface and a communication interface such that the mini-display is supplied with power (e.g., via one or more batteries of a laptop computer) and such that the mini-display (e.g., as a mini-display unit) is supplied with information via an appropriate interface where circuitry of the mini-display can then render graphics (e.g., text, graphics, etc.) to the mini-display. As an example, a graphics process may be part of the mini-display and/or part of a keyboard housing and/or part of a display housing. For example, a laptop computer can include a graphics card that can receive information and render information to one or more displays. As an example, a laptop computer may include a plurality of graphics cards where each display may have a dedicated graphics card (e.g., dedicated graphics circuitry). As an example, a laptop computer may include a graphics card that can support multiple displays where one of the multiple displays is a mini-display; noting that where a device includes multiple mini-displays, such a graphics card may support multiple mini-displays.

As an example, a multiple display device can include a mini-display that provides a user with "life support" information in a "heads-up" manner without the user having to toggle between screens to get his other applications and/or handle another device. As an example, a mini-display may be disposed between a top row of keys of a keyboard and a main display. As an example, a mini-display may be disposed between a spacebar of a keyboard and a front end of a keyboard housing (e.g., an end closest to a user when touch typing).

As an example, a mini-display can include a connector for a removable mouse. Such a connector may electronically connect to the removable mouse and/or allow for physical connection to the removable mouse as an anchor point (e.g., for keeping the removable mouse secured to a device that includes the mini-display). As an example, a removable mouse may include a plug such as a BLUETOOTH® communication USB plug that may be stored within the removable mouse or, for example, may be set within a USB socket of a device that includes the mini-display. In such an example, a user may use that USB plug for another device such that the removable mouse can be utilized with one or more devices.

As an example, a connector can include a power interface for charging the removable mouse when not in use. As an example, the removable mouse can be removed by hand and used as a stand-alone mouse on a flat surface. As an example, a removable mouse may be wired and/or wireless. As an example, a removable mouse may be a travel mouse that is built into a laptop computer for convenience as a complete travel system. In such an example, a user does not have to remember to bring a separate mouse, which would take up storage space in the user's bag. As an example, a removable mouse may extend from a side of a mini-display and may be reorientable in from a relatively flat to a tented orientation for hand/finger comfort during use. When use is completed, the removable mouse may be reoriented and reattached to the side of the mini-display.

As mentioned, one or more housings can include a transparent window or transparent windows. For example, consider a glass window in a main display housing or in a keyboard housing that is an approximately full width window (e.g., greater than about 70 percent of the width of the housings). As an example, one or more types of circuits may be embedded in a transparent window, optionally to cause the window to become opaque, translucent, transparent, glow, etc. As an example, one or more circuits may utilize indium tin oxide (ITO) material, which can be transparent. As an example, a window may be touch sensitive and may, for example, change state upon touch. For example, consider a window being in an opaque state, transitioning to a glowing state indicative of a notification and transitioning to a transparent state upon being touched (e.g., a state where information rendered to a display such as a mini-display can be viewable through the window). Where a user desires not to view the notification, the user may refrain from touching the window and the glowing state may transition back to the opaque, non-glowing state within a minute or less.

As an example, a device can include one or more antennas, which may be operatively coupled to other communication circuitry. As an example, a transparent window can be adjacent to an antenna and may be made of a material that allows for transmission of electromagnetic energy to and/or from the antenna.

As mentioned, a device can include a removable tablet, which is a removable keyboard with a keyboard side and a display side. For example, a removable tablet can be a PC tablet module with a keyboard on its rear side where either side to be used depending on the orientation when nested in a keyboard housing of a device.

As an example, a transparent window may be included in a display housing of a device such that a portion of a display of a removable tablet can be visible through the transparent window. In such an arrangement, a window in the top section of a laptop computer can extend the usefulness of a nested tablet screen. As mentioned, a keyboard housing can include a mini-display. As an example, a nested keyboard may include a mini-display where, given a main display housing with a transparent window, at least a portion of the mini-display may be viewable through the transparent window. As an example, where a keyboard housing includes a transparent window and a removable tablet includes a keyboard side with a mini-display, at least a portion of the mini-display may be visible through the transparent window when the keyboard side of the removable tablet is down and the display side of the removable tablet is up when the removable tablet is nested in the keyboard housing. As an example, a mini-display of a keyboard side of a removable tablet may be a linear display, which may be a single line display or may be a multiple line display.

Various devices can include multiple displays (e.g., as a multi-display device or a multiple display device). As an example, all or part of a mini-display may be visible through a transparent window. As an example, part of a display of a removable tablet may be visible through a transparent window. Various display arrangements of a device with multiple displays can allow for easy viewing access (e.g., of texts, phone information, urgent messages, emails, etc.) when the device is in one or more orientations, which can include, for example, a folded closed orientation when a user is in sight of the device (e.g., carrying the device or in the same room as the device).

As an example, a device can include a keyboard module that functions as a laptop computer keyboard when nested in a keyboard housing. As an example, a device can include a keyboard module with a linear display along its upper face, which may be a single line of alphanumeric text or multiple lines of text or, optionally, a display configured to render graphics (e.g., via a graphics processor, etc.). As an example, graphics may be graphics renderable via, for example, Open Graphics Library (OpenGL) technology, which is a cross-language, cross-platform application programming interface (API) for rendering 2D and 3D vector graphics. Such an API may be used to interact with a graphics processing unit (GPU), for example, to achieve hardware-accelerated rendering. As an example, a multiple display device can optionally include one or more graphics processors that can implement vector graphics.

As an example, a multiple display device with a nested tablet can offer dual display functionality for multitasking (e.g., graphics on a main display and messaging on a keyboard linear display, which may be a mini-display).

As an example, a multiple display device can provide private/secure viewing of messages by a user, for example, when the device is folded tent-like with one display facing another viewer (e.g., presentation or screen sharing mode).

As an example, a multiple display device can include a tablet module that offers a larger combined dual display area (e.g., a tablet display and a main display), either or both with touch screen input circuitry. In such an example, the device may provide a dual screen for book-like reading and/or a large landscape orientation viewing experience.

As an example, a removable tablet module with a mechanical or membrane keyboard on its rear side may reduce the number of devices for a user to perform various tasks. For example, a user may suffice with such a multiple display device with a removable tablet (e.g., removable tablet module) rather than having both a laptop computer and a separate tablet as two distinct devices that do not physically fit or nest to each other. A multiple display device can be useful for travel and for travel related scenarios such as being in a hotel room, a bus from an airport, a taxi, etc. As an example, a removable tablet may be removed, oriented and replaced (e.g., nested) by hand. For example, a user may remove, flip and reinsert/nest a removable tablet for use of either surface feature (e.g., keyboard side or display side). As an example, a nested tablet or nested tablet with rear keyboard may be removed to function as a stand-alone tablet.

As an example, a removable tablet may include one or more displays. For example, a one display removable tablet can include a display side and a keyboard side where the keyboard side does not include a display and a multiple display tablet can include a keyboard side that does include a display such as a mini-display. As an example, where a device includes one or more transparent windows (e.g., optionally of controllable transparency, opaqueness, translucency, etc.), one or more displays (in part or in whole) may be viewable via the one or more transparent windows.

As an example, a device can include a keyboard housing with a removable keyboard where the removable keyboard includes a single display that is a mini-display on a keyboard side of the removable keyboard. In such an example, the removable keyboard may be optionally oriented with the keyboard side up or down in the keyboard housing. Where the keyboard housing includes a transparent window, the down orientation may allow for viewing of the single display through the transparent window of the keyboard housing and, where a display housing of the device includes a transparent window, the up orientation may allow for viewing of the single display through the transparent window of the display housing.

Figure 2:
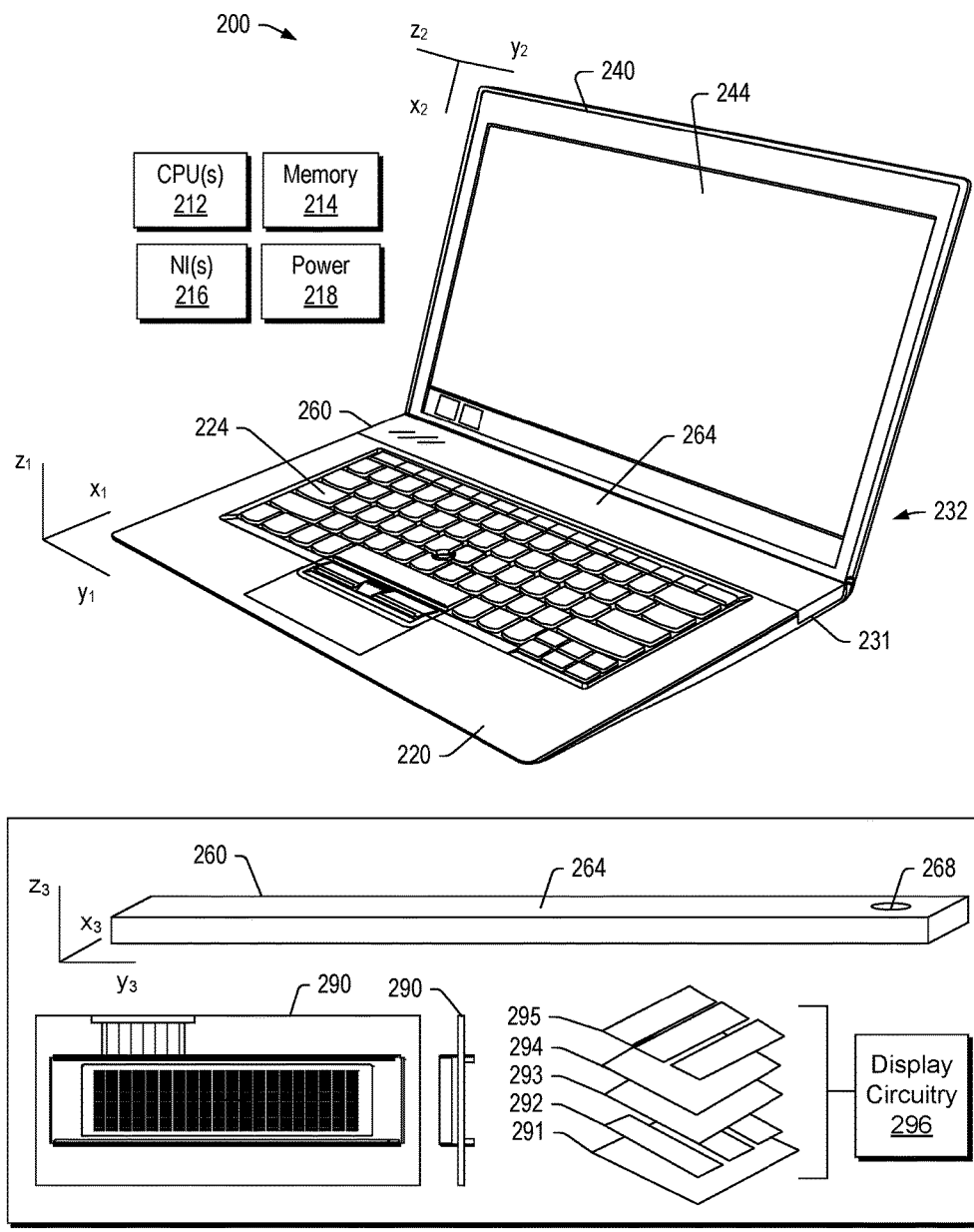
FIG. 2 is a diagram of an example of a device in an example orientation and an example of a display with an example of display circuitry.

FIG. 2 shows an example of a device 200 that includes a processor 212 or processors, memory 214 accessible by the processor 212; a display housing 240 that includes a display 244 operatively coupled to the processor 212; a keyboard housing 220 that includes a keyboard 224 and a recess 231 for a mini-display unit 260 that includes a mini-display 264. The device 200 includes one or more hinges 232 that operatively couple the display housing 240 and the keyboard housing 220 and optionally couple the mini-display unit 260 to the display housing 240 and/or the keyboard housing 220. As an example, the mini-display unit 260 may change its orientation responsive to a transition of the device from a closed orientation to an open orientation. For example, the device 200 is shown as a clamshell device that can include a closed, clamshell orientation where the display 244 faces keys of the keyboard 224 of the keyboard housing 220. Various Cartesian coordinate systems are shown in FIG. 2, which may be utilized to describe one or more features of a device, a housing, a display, a recess, etc. As an example, a Cartesian coordinate system may be a right-handed or a left-handed coordinate system.

FIG. 2 shows an example of the mini-display 260 as including an ambient light sensor 268, which may be utilized to sense ambient light and optionally adjust brightness of the mini-display 260 (e.g., light emitting circuitry of the mini-display).

FIG. 2 shows an example of the mini-display 260 as including an OLED assembly 290 that includes OLED display components such as, for example, a substrate 291, an anode 292, a conductive layer (e.g., organic molecules or polymers) 293, an emissive layer (e.g., organic molecules or polymers) 294 and a cathode 295. As shown, the mini-display 260 includes display circuitry 296, which may be operatively coupled to one or more of the OLED display components. In the example of FIG. 2, the OLED assembly 290 includes a character height of four characters (e.g., 4 lines) with a number of characters per line. While 20 characters per line are shown in the example of FIG. 2, a mini-display may include from about 8 characters to about 500 characters per line. As mentioned, a mini-display may be a graphics display, which can render characters (e.g., text characters) and other graphics. As an example, a mini-display may include multiple display assemblies, which may optionally be arranged as panels (e.g., in a panel vector arrangement and/or a panel matrix arrangement).

As an example, a mini-display may be about 2 cm to about 20 cm or more in a widthwise dimension (e.g., y-direction) and may be about a few millimeters to about a few centimeters in a depthwise dimension (e.g., x-direction) and may be about a few millimeters to a centimeter or more in a thickness dimension (e.g., z-direction).

As an example, a mini-display unit can include a wrap-around mini-display where, for example, the mini-display is a flexible component that can include a U-turn such that a portion of the mini-display faces one direction and another portion of the mini-display faces another direction. For example, consider a mini-display that is visible from a keyboard side of a keyboard housing and from a back side of the keyboard housing where the mini-display includes a U-turn that may optionally allow for viewing of information from an edge of a device.

As an example, an OLED display can be made up of a layer of organic material placed between two conductors. In such an example, the two conductors (an anode and a cathode) can be between a glass top plate (seal) and a glass bottom plate (substrate). When an electric current is applied to the two conductors, the organic material produces a bright, electro-luminescent light. When energy passes from the negatively charged layer (cathode) to the other (anode) layer, it stimulates the organic material between the two, which in turns emits lights that is visible through the outermost layer of glass.

To produce color, an electric current can be applied to stimulate relevant pixels on the OLED display. Pixels can be created by an arrangement of the cathodes and anodes; which can be arranged perpendicular to each other. The electric current applied to the selected strips of anodes and cathodes determine which pixels get turned on and which pixels remain off and brightness of each pixel can be proportional to the amount of applied current.

A color OLED can include a metal cathode with a negative charge, an electron transport layer, organic material, a hole transport layer, and an anode with a positive charge. Each pixel of a color OLED may be divided into red, green, and blue sub-pixels. When a controller (e.g., display circuitry) applies an electric current to a particular pixel, the current passes through the organic material causing the material to emit light. By adjusting the intensity of the electric current in each red, green, and blue sub-pixel, specific colors and gradients can be created.

As an example, a mini-display may be a character display and/or a graphic (or graphics) display. A mini-display may be relatively thin (e.g., a few millimeters to about 1 cm) can be self-illuminated, variable brightness (e.g., consider multi-step brightness) can include one or more of a serial and/or parallel microprocessor (MPU) interface, can include one or more of SPI, I$^2$C, parallel, etc., interfaces, etc. As an example, circuitry of a display may include a font table.

Figure 3:
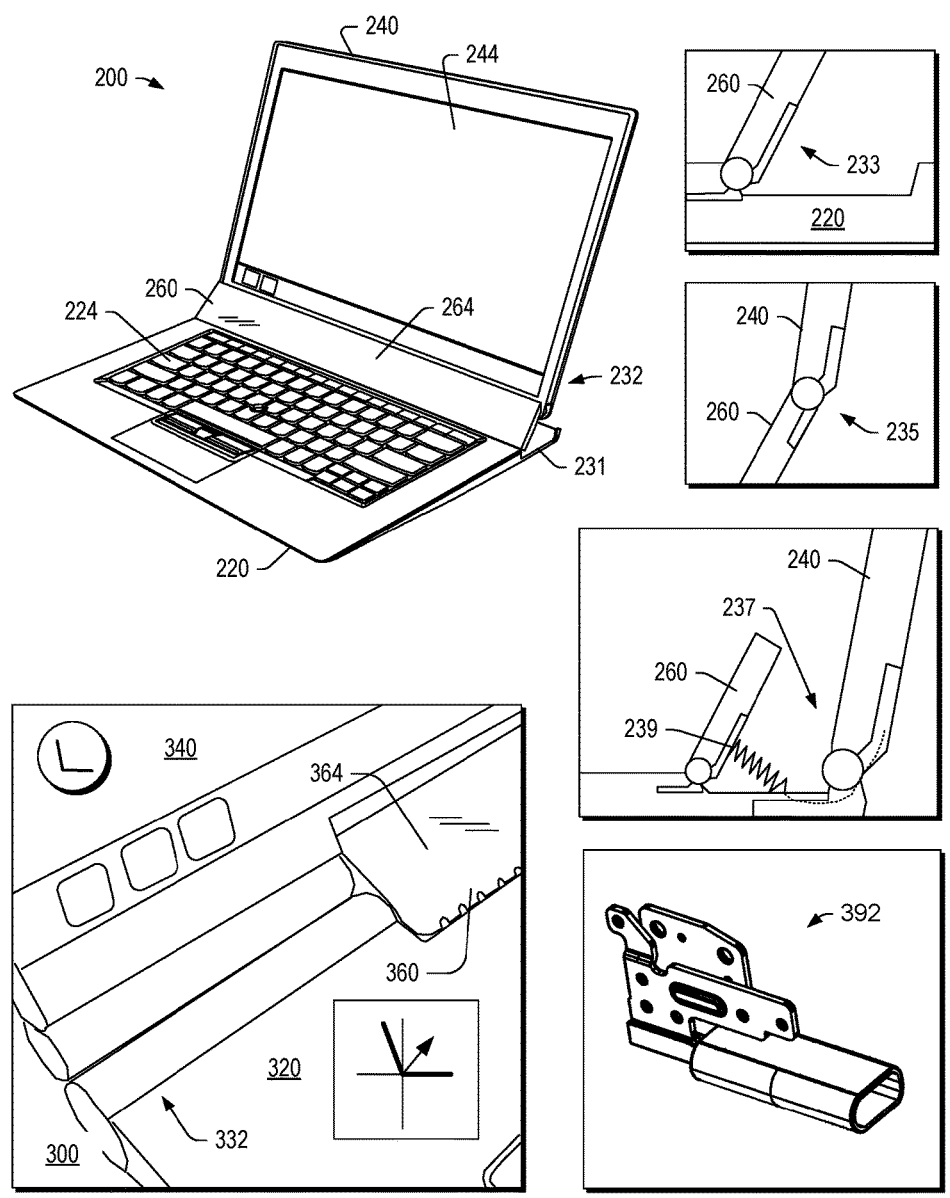
FIG. 3 is a view of the device of FIG. 2 in another example orientation, a diagram of an example of another device and a series of a diagrams of examples of hinges or hinge assemblies.

FIG. 3 shows the device 200 of FIG. 2 where the mini-display unit 260 is tilted with respect to a plane defined by the keyboard 224 of the keyboard housing 220. Specifically, the mini-display unit 260 is lifted up from the recess 231 of the keyboard housing 220 noting that the mini-display unit 260 may be operatively coupled to the display housing 240 and one or more hinges may allow for angling the display housing 240 with respect to the keyboard housing 220. In such an example, the angle may be about 20 degrees to about 80 degrees, where a user in an ergonomic seating position with the device 200 on a desk may have a viewing angle of about 40 degrees to about 50 degrees (e.g., angle from main display 244 to the user's eyes). In such an example, the mini-display 264 can be readily viewable by the user; whereas, in the orientation shown in FIG. 2, the user may have to lean forward to more readily discern information rendered to the mini-display 264.

FIG. 3 shows various examples of hinges, which may be hinge assemblies. For example, a hinge 233 may operative couple the keyboard housing 220 and the mini-display unit 260, a hinge 235 may operatively couple the display housing 240 and the mini-display unit 260, a hinge 237 may operatively couple the keyboard housing 220 and the display housing 240 where, for example, the hinge 233 may be biased by a biasing mechanism 239, which may be or include one or more springs. As an example, a biasing mechanism may be automatically and/or manually controlled (e.g., actuated, etc.). As an example, a biasing mechanism may be operatively coupled to a display housing such that movement of the display housing may cause the biasing mechanism to tilt a mini-display unit in one direction (e.g., for deployment) and/or in another direction (e.g., for storage). For example, the biasing mechanism 239 may be attached to a saddle of the hinge 237 that is attached to the display housing 240 such that opening of the device 200 releases tension to allow the mini-display unit 260 to tilt up and such that closing of the device 200 increases tension to cause the mini-display unit 260 to tilt down (see, e.g., dotted line coupled to biasing mechanism 239).

As an example, a hinge may be a biased hinge, which may include one or more biasing components (e.g., one or more springs, etc.). As an example, a hinge operatively coupled to a mini-display unit may be a biased hinge that may automatically cause a mini-display unit to tilt up while opening a device. Upon closing, contact between a display housing and a mini-display unit may tilt the mini-display downwardly (e.g., to a storage orientation).

As an example, wires, electrical connectors, etc. may be part of a hinge and/or a hinge can include one or more passages for wires, etc. As an example, wires may be disposed at a position that is not a hinge position (e.g., wires may be in a position between a left hinge and a right hinge).

FIG. 3 also shows an example device 300 where a mini-display unit 360 with a mini-display 364 is disposed as part of a hinge assembly 332 that operatively couples the display housing 340 to the keyboard housing 320. In such an example, the mini-display unit 360 may be oriented at an angle for viewing when the device 300 is in an open orientation.

FIG. 3 further shows an example of a hinge assembly 392, which is a two axle hinge that includes a saddle that can be operatively coupled to a component (e.g., a housing, etc.) and another saddle that can be operatively coupled to a component (e.g., a housing, etc.). The hinge assembly 392 further includes a tubular body, which may be utilized as part of a mini-display unit such as the mini-display unit 360 and/or that may be operatively coupled to a mini-display unit such as the mini-display unit 360.

As an example, the one or more hinges 232 may include be one or more hinge assemblies such as, for example, a multiple axle hinge that may be coupled to gears that mesh and/or friction coupling that allow for positioning the housings 220 and 240 with respect to each other. As an example, the one or more hinges 232 may be one or more hinge assemblies such as the hinge assembly 392.

In the examples of FIGS. 2 and 3, the device 200 and/or the device 300 can include display circuitry that may be dedicated to a single display or that may be operable for multiple displays. As an example, the mini-display unit 260 and/or the mini-display unit 360 may include display circuitry that can receive information and render information to the mini-display 264 or the mini-display 364 based at least in part on the received information. As an example, the mini-display unit 260 and/or the mini-display unit 360 may be electrically connected to circuitry of the keyboard housing 220 or the keyboard housing 320 and/or circuitry of the display housing 240 or the display housing 340. As an example, the device 200 and/or the device 300 can include wireless communication circuitry, which may allow, for example, receipt of information and rendering of information to one or more of the displays 244 and 264 or 344 and 364. As an example, the mini-display 264 and/or the mini-display 364 may be operable independent of the display 244 or the display 344.

Figure 4:
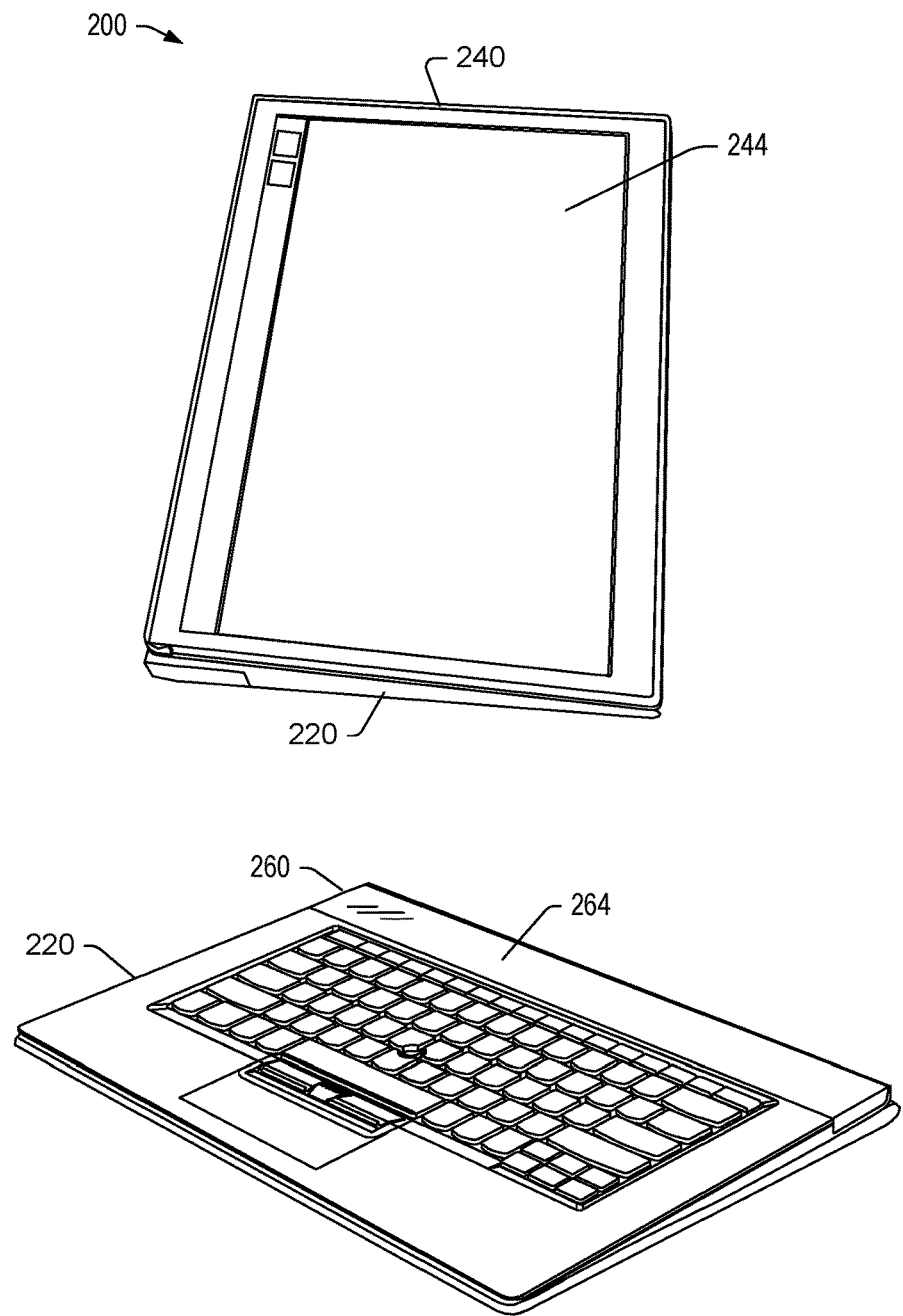
FIG. 4 is a series of views of the device of FIG. 2 in another example orientation.

FIG. 4 shows the device 200 in an example orientation where a back side of the display housing 240 is facing a back side of the keyboard housing 220.

Figure 5:
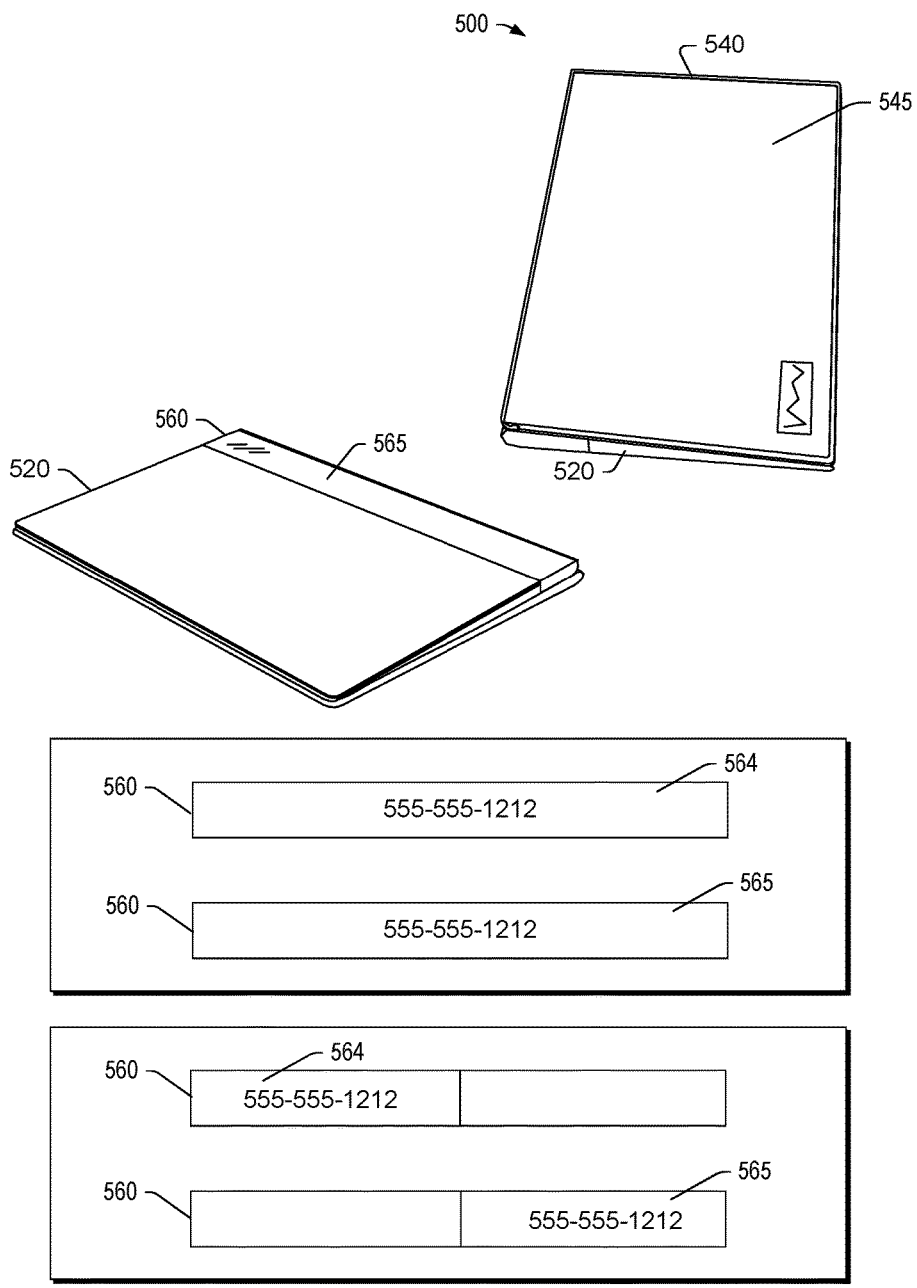
FIG. 5 is a series of views of an example of a device and examples of mini-displays.

FIG. 5 shows an example of a device 500 in a closed orientation with a keyboard housing 520, a display housing 540 with a back side 545 and a mini-display unit 560 that includes a back side display 565. FIG. 5 shows various examples of mini-display unit arrangements including a two-sided mini-display unit 560 with a front side mini-display 564 and the back side mini-display 565; a split mini-display unit 560 with the front side mini-display 564 and the back side mini-display 565 where they mini-displays 564 and 565 can be offset. As an example, a mini-display unit may be see through such that information may be rendered using circuitry (e.g., ITO, etc.) to be visible from one side or the other side.

In the example of FIG. 5, the keyboard housing 520 may include a recess for the mini-display unit 560, which may include a transparent window. Or, for example, the mini-display unit 560 may extend from a keyboard side of the keyboard housing 520 to a back side of the keyboard housing 520.

Figure 6:
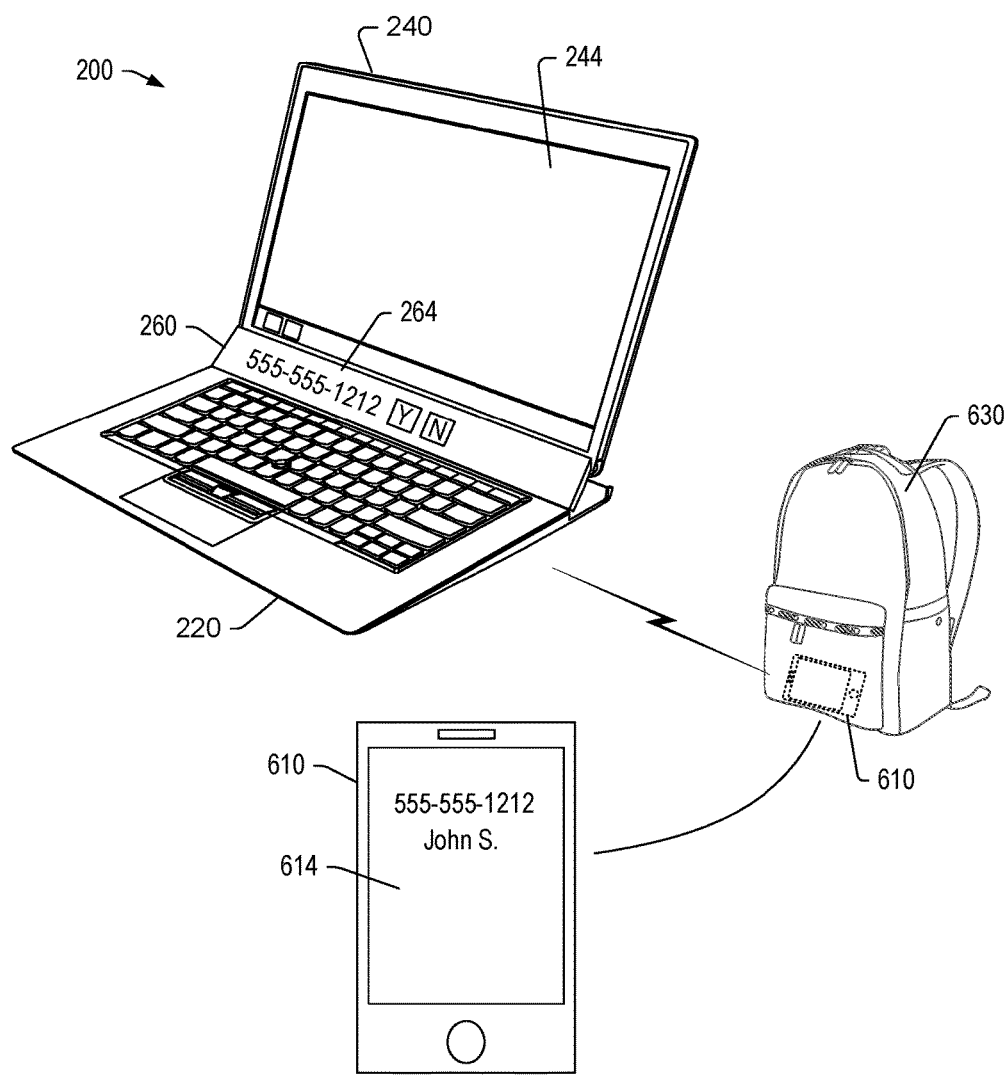
FIG. 6 is a diagram of the device of FIG. 2 in communication with an example of another device.

FIG. 6 shows the example device 200 of FIG. 2 as being in communication with another device 610, which may be, for example, a smartphone with a display 614. As shown, the device 610 may be in a backpack 630 (e.g., a bag, a purse, etc.) and wirelessly in communication with the device 200 such that a notification generated by the device 610 is communicated to the device 200 and rendered to the mini-display 264. For example, consider rendering of a phone number of a call received by the device 610. In such an example, where the mini-display 264 is a touchscreen display, one or more graphic controls may be rendered to allow a user to touch the mini-display 264 to instruct the device 200 to interact with the device 610. For example, consider a "Y" graphic for answering the phone call and a "N" graphic for not answering the phone call (e.g., dismissing the call). As an example, where the user touches the "Y" graphic, the phone call may occur via a speaker and microphone of the device 200 (e.g., or a headset, etc.).

Figure 7:
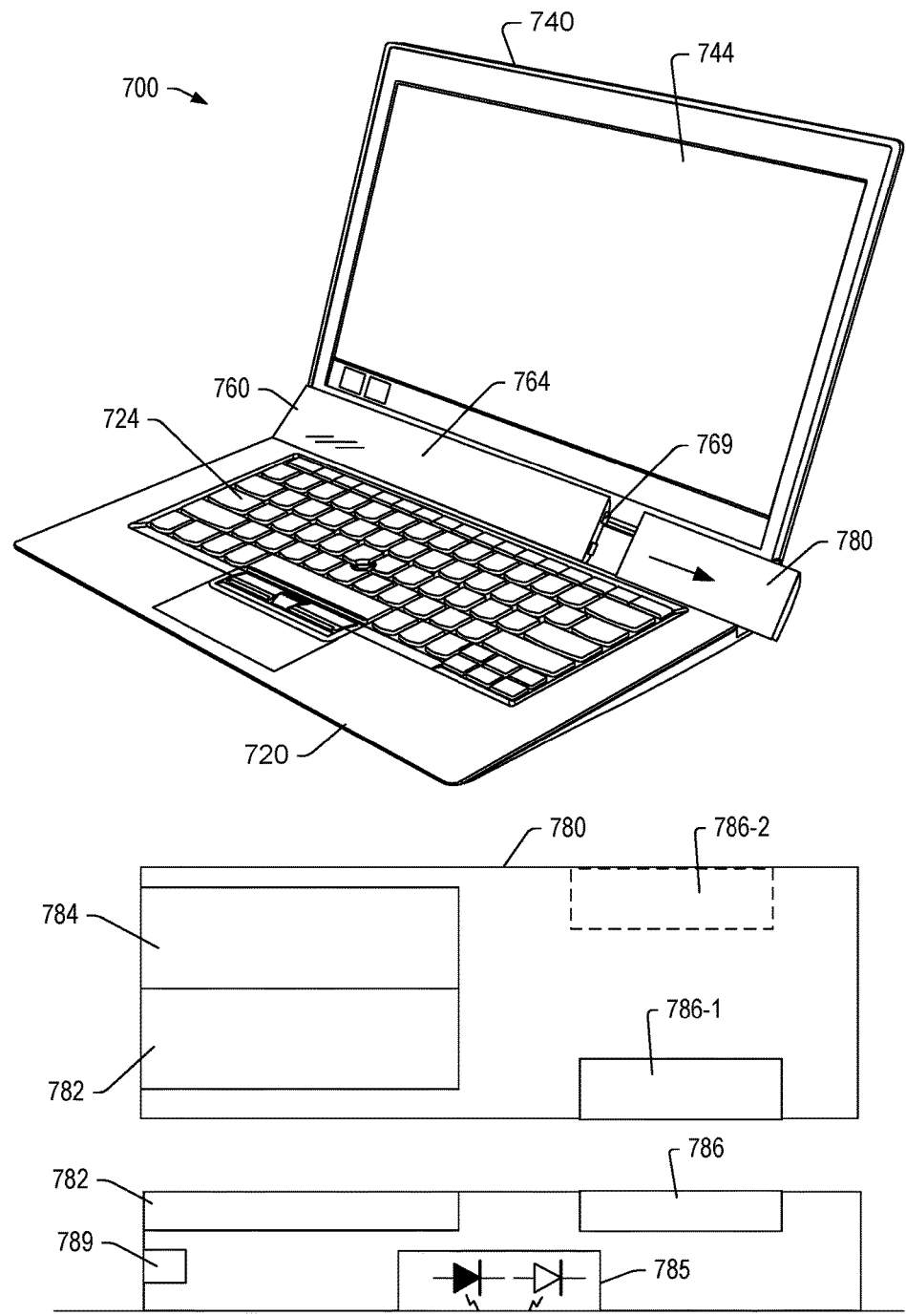
FIG. 7 is a series of views of an example of a device with an example of a removable mouse.

FIG. 7 shows an example of a device 700 that includes a keyboard housing 720 with a keyboard 724, a display housing 740 with a display 744 and a mini-display unit 760 that includes a mini-display 764 and a detachable mouse 780, which may be referred to as a removable mouse. FIG. 7 also shows an icon 747 rendered to the display 744, which may be a mini-display icon where an item rendered to the display 744 may be dragged and dropped to the icon 747 to cause that item to be rendered at least in part to the mini-display 764.

As shown, the mouse 780 can be decoupled from the device 700. The mouse 780 can include buttons 782, 784, 786-1 and 786-2 as well as tracking circuitry 785, which may be optical tracking circuitry (e.g., one or more diodes which may transmit energy and one or more detectors that may receive reflected energy). As an example, the buttons 782 and 784 may be left and right buttons (e.g., for left clicks and right clicks) and the buttons 786-1 and 786-2 may be for thumb actuation (e.g., left thumb or right thumb where the mouse may be ambidextrous). While the mouse 780 is illustrated as being tilted with the mini-display unit 760, the mouse 780 may remain in a relatively planar orientation with respect to the keyboard housing 720. As an example, the mouse 780 may be removable from the device 700 and be storable in its own recessed area, which may be accessible from an edge of the keyboard housing 720, a back side of the keyboard housing 720, etc., where such locations may correspond to a widthwise area that includes the mini-display unit 760.

FIG. 7 also shows the device 700 as including one or more connectors 769 that may be operatively connected to one or more connectors 789 of the mouse 780. As an example, such one or more connectors may provide for physical connection to secure the mouse 780 to the device 700, may provide for power connection to charge a battery or batteries of the mouse 780 and/or may provide for information connection to transfer information to and/or from the mouse 780 and the device 700.

Figure 8:
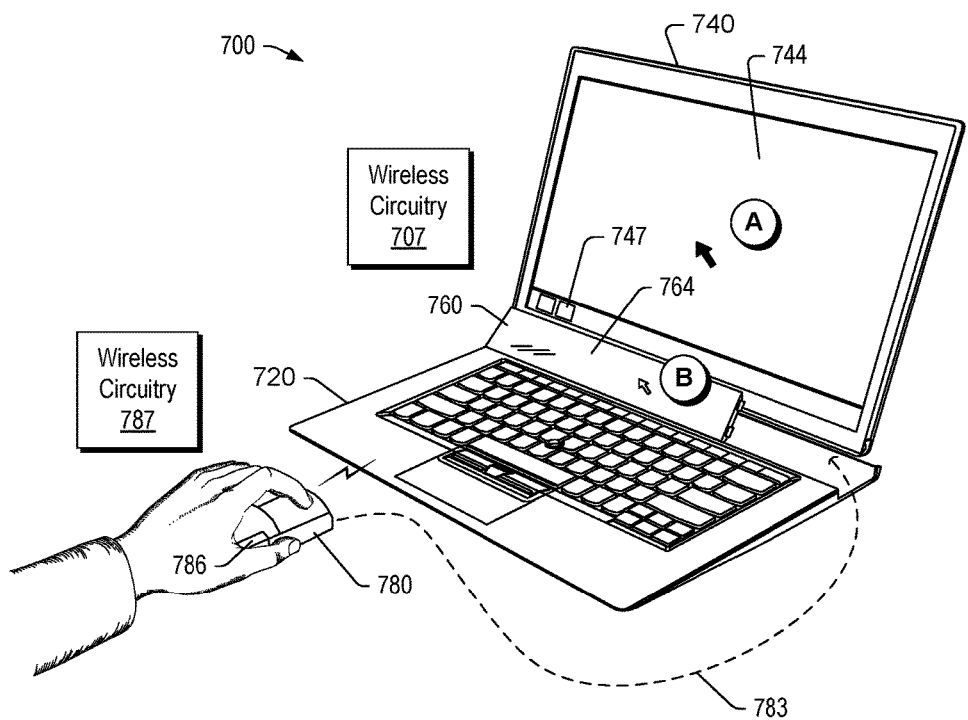
FIG. 8 is a series of views of examples of removable mice and the device of FIG. 7 and an example of a method.
Figure 8:
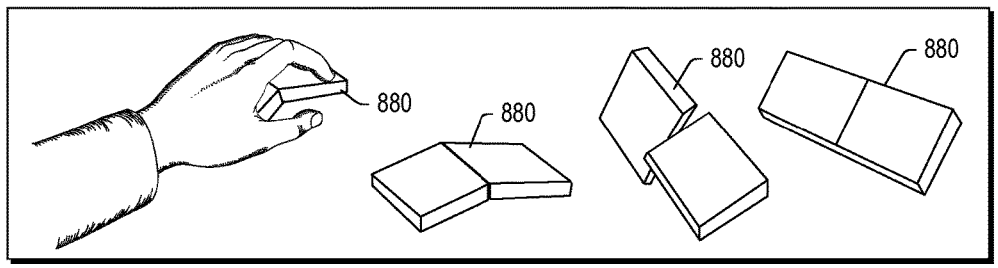
Figure 8:
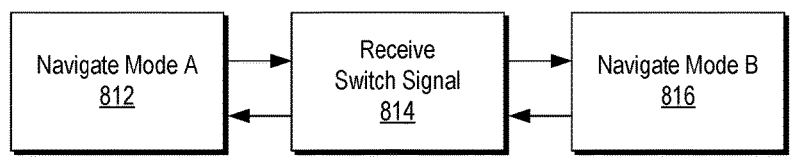

FIG. 8 shows the device 700 as including wireless circuitry 707 and the mouse 780 as including wireless circuitry 787 where the mouse 780 can instruct the device 700 via wireless communications between the circuitry 707 and 787. As an example, the mouse 780 may optionally be a corded mouse. For example, the device 700 may include a cord 783 that is a wire or wires for power and/or instructions. As an example, the cord 783 may be a retractable cord that can be retracted via reel of the device 700.

FIG. 8 also shows a mouse 880, which may be a mouse that can have a relatively flat orientation and a tented orientation. For example, the mouse 880 may be stored in the device 700 in the flat orientation and removed and tented for use. As an example, a tenting mechanism may provide for tenting via rotation of a portion of the mouse 880 with respect to another portion of the mouse. Or, for example, a tenting mechanism may be via pushing in at a point between two portions to create a fold and fold angle. As an example, the mouse 780, the mouse 880 and/or the device 700 may include a dongle such as a USB plug that includes wireless communication circuitry that can be operatively coupled to a device (e.g., in a dongle socket, a USB socket, etc.) such that the mouse 780 and/or the mouse 880 can be utilized with a device which may be the device 700 or a device other than the device 700.

As an example, the device 700 can include one or more connectors that can be operatively connected to the mouse 780 (e.g., or the mouse 880). As an example, the mouse 780 or the mouse 880 can include one or more rechargeable batteries that can be charged via power circuitry of the device 700. As an example, the device 700 may monitor and appropriately charge the mouse 780 when it is physically coupled to the mini-display unit 760 of the device 700.

As shown in FIGS. 7 and 8, the mini-display unit 760 may be a relatively planar unit that extends widthwise across the device 700 between an upper row of keys of the keyboard 724 and the display 744 and, for example, the mouse 780 and/or the mouse 880 may be relatively planar. As an example, the mouse 780 may be curved to one side and relatively planar to another side where the curved side may be a recess side that is received by a recess of the keyboard housing 720. As an example, with reference to FIG. 5, a mouse may be part of the mini-display unit 560 and, for example, removable in one or more orientations of the device 500. For example, a mouse may be removable in the closed orientation shown in FIG. 5.

FIG. 8 also shows an example of a method 810 that includes a navigation block 812 for navigating information in a first mode (Mode A) by controlling a cursor rendered to the display 744, a reception block 814 for receiving a switch signal to switch modes and a navigation block 816 for navigating information in a second mode (Mode B) by controlling a cursor rendered to the display 764. As an example, a thumb button or other feature may be utilized to switch from Mode A to Mode B. In such an example, a user may utilize the mouse 780 (or the mouse 880) to select one or more graphical controls, etc. rendered to either the display 744 or the display 764 to cause the device 700 to perform one or more actions.

Figure 9:
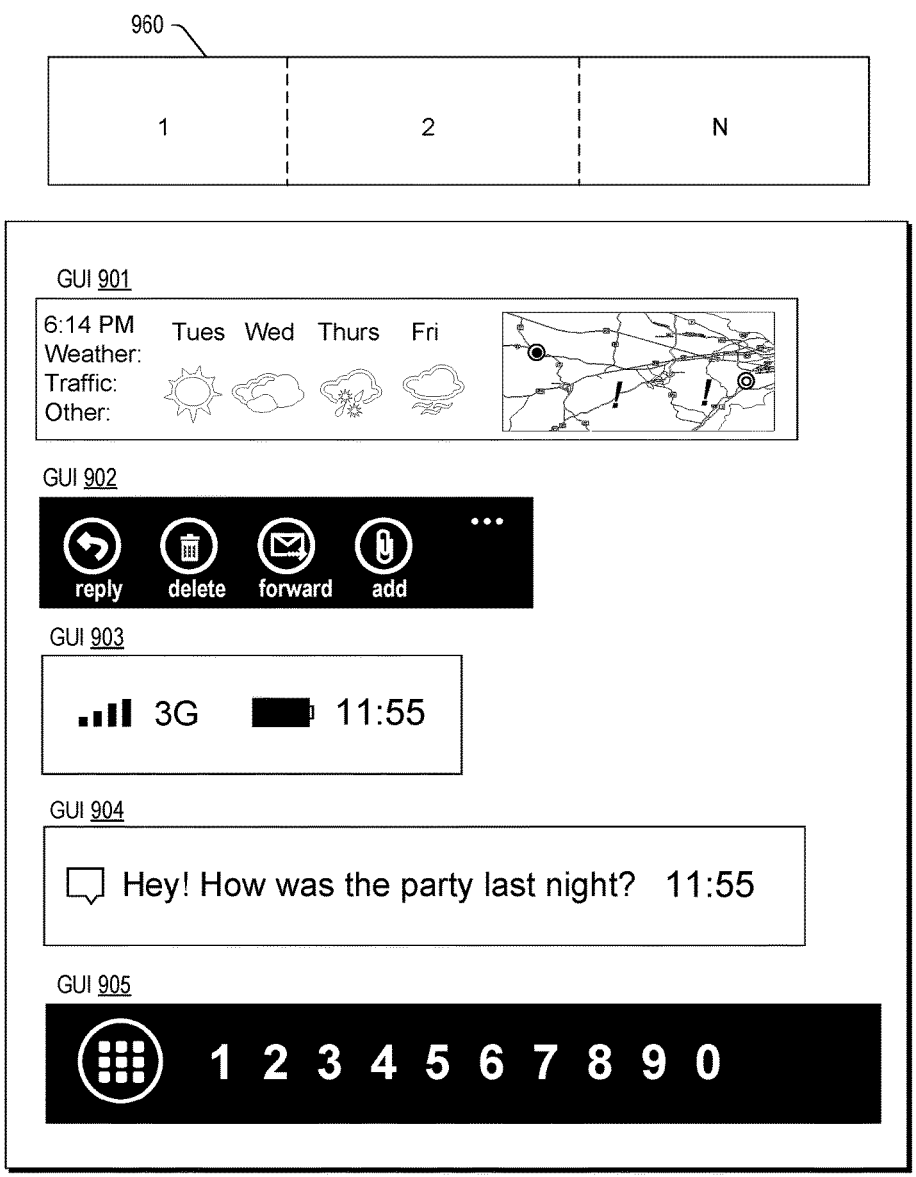
FIG. 9 is a series of views of examples of graphical user interfaces that can be rendered to a display of a device that includes multiple displays.

FIG. 9 shows an example of a mini-display unit 960 that includes panels 1, 2 to N, which may be user defined or, for example, defined via one or more display assemblies (see, e.g., FIG. 2). FIG. 9 also shows example GUIs 901, 902, 903, 904 and 905, which may optionally be assigned to one or more panels of the mini-display unit 960. The GUI 901 shows information such as weather and/or traffic information, which may be from a service (e.g., an Internet service, a cellular service, etc.). The GUI 902 shows information associated with email. The GUI 903 shows information associated with a connection, power and time, which may be that of a device or a device that is in communication with the mini-display unit 960. The GUI 904 shows messaging information. The GUI 905 shows a keypad graphic with keys that may be utilized, for example, for numeric entry to perform one or more operations (e.g., dial a phone number, operate a calculator, etc.).

Figure 10:
FIG. 10 is an example of a use scenario.

FIG. 10 shows an example of a multiple display device 1000 that is being utilized in combination with a large display 1004 where the device 1000 includes a display 1044 and a mini-display 1064. In such an example, a user may utilize the keyboard of the device 1000 to enter information such as text in a word processing application where the text is rendered to the display 1004, and optionally the display 1044. The user may monitor information such as notifications via the mini-display 1064.

Figure 11:
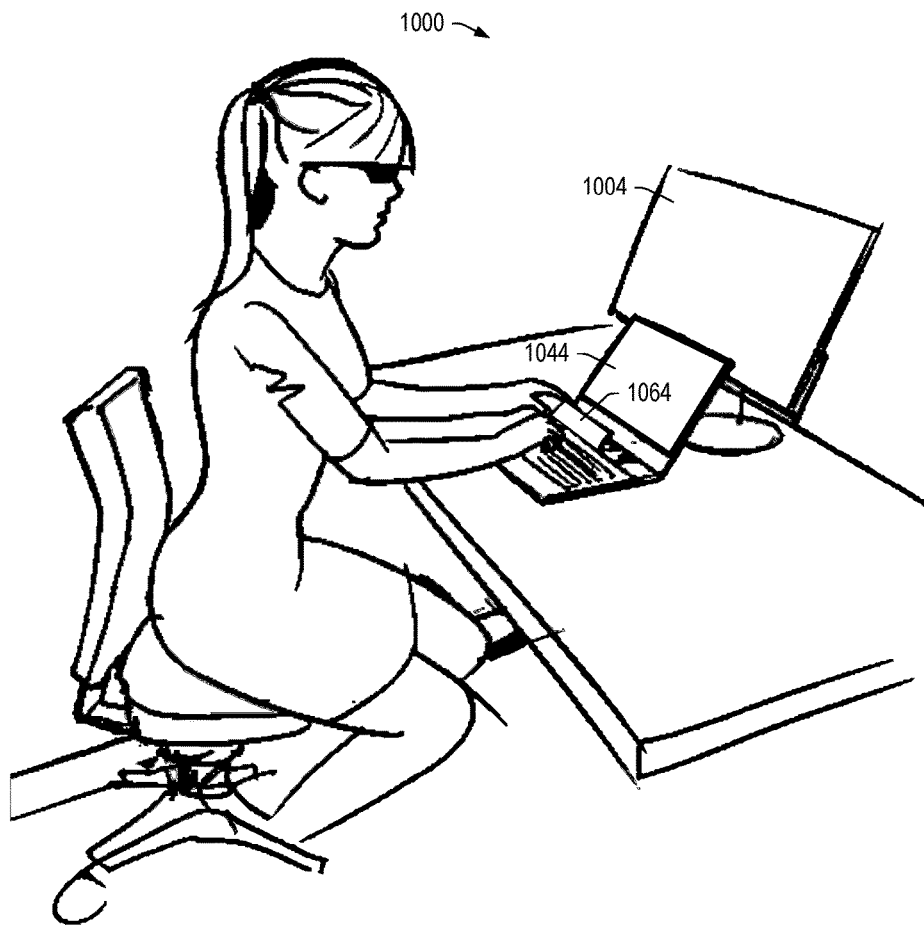
FIG. 11 is an example of a use scenario.

FIG. 11 shows the scenario of FIG. 10 where a notification has been received and associated information rendered to the mini-display 1064. In such an example, the user may quickly glance at the mini-display 1064 with minimal distraction from a task being performed with respect to information rendered to the display 1004 (e.g., and/or optionally the display 1044).

Figure 12:
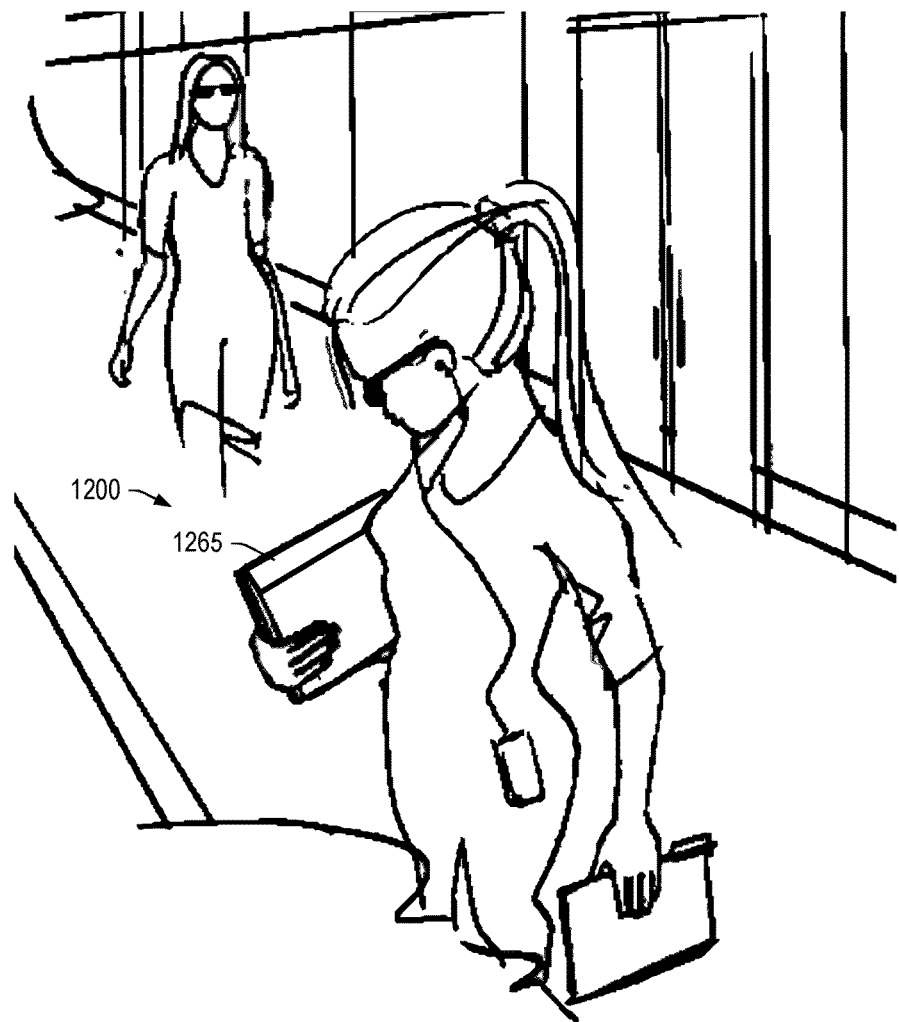
FIG. 12 is an example of a use scenario.

FIG. 12 shows an example scenario where a device 1200 includes a mini-display 1265 such as, for example, per the device 500 of FIG. 5. In such a scenario, a user may be carrying the device 1200 and glance down to view a notification. As an example, the notification may be generated by another device such as a smartphone that is being used to render audio via earbuds. The user may have yet another item in her other hand, such as a purse or bag. In such an example, the user can securely carry the device 1200, utilize the smartphone and with minimal inconvenience, glance at the mini-display 1265 to see a notification (e.g., or other information).

Figure 13:
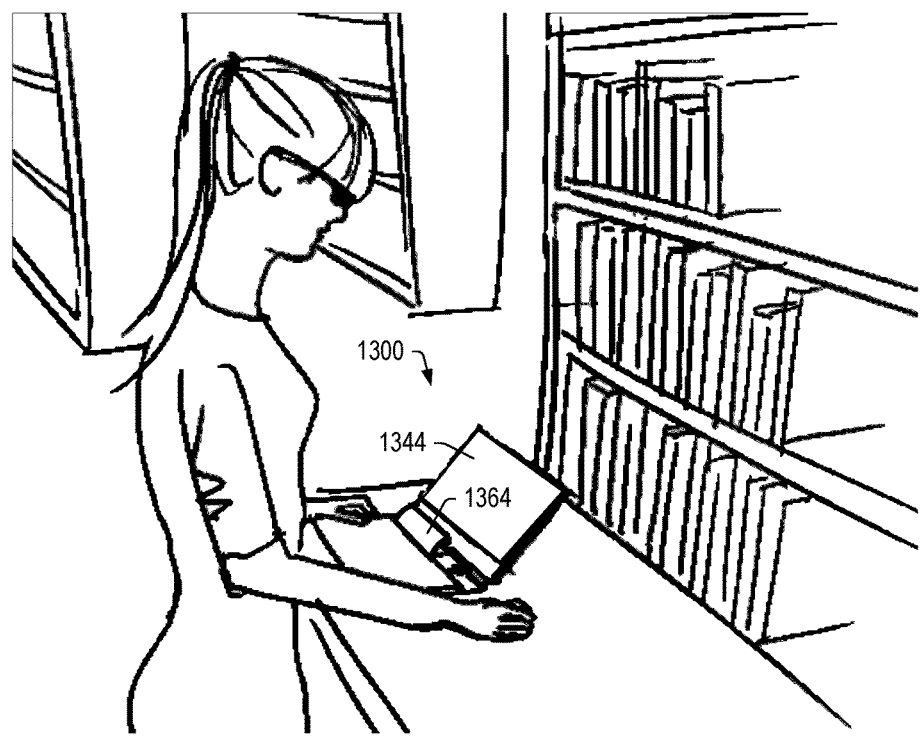
FIG. 13 is an example of a use scenario.

FIG. 13 shows an example scenario where a device 1300 includes a display 1344 and a mini-display 1364. In such an example, the user may be in a quiet place such as a library where cell phone use is prohibited. As shown, the user may be able to view information rendered to the display 1344 and be able to glance at the mini-display 1364 if a notification arises or other type of information is received by the device 1300. In such an example, a user may with minimal effort determine whether an important phone call has been received via a smartphone, etc. and whether the user should exit the space to handle that phone call. In such a scenario, the user may have to proceed via a turnstile to exit and enter and/or security. As such, the user may not want to exit if a phone call is low priority or can be addressed later, whereas, for a higher priority call, the user may decide to exit.

Figure 14:
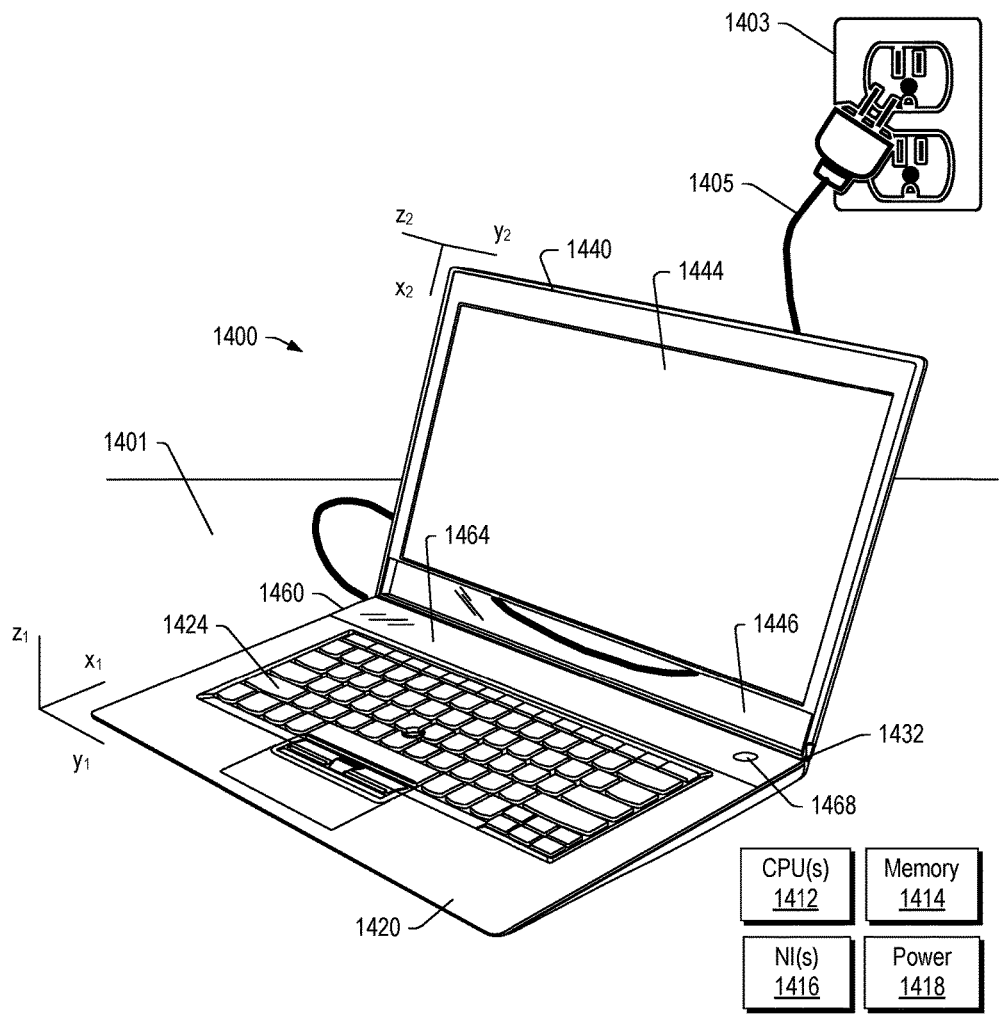
FIG. 14 is a diagram of an example of a device that includes an example of a transparent window in a display housing of the device.

FIG. 14 shows an example of a multiple display device 1400 that includes a processor 1412 or processors, memory 1414 accessible by the processor 1412; a display housing 1440 that includes a display 1444 operatively coupled to the processor 1412 and a transparent window 1446; a keyboard housing 1420 that includes a keyboard 1424 and a mini-display unit 1460 that includes a mini-display 1464. The device 1400 includes one or more hinges 1432 that operatively couple the display housing 1440 and the keyboard housing 1420. As an example, the mini-display unit 1460 may change its orientation responsive to a transition of the device from a closed orientation to an open orientation.

Various Cartesian coordinate systems are shown in FIG. 14, which may be utilized to describe one or more features of a device, a housing, a display, a recess, etc. As an example, a Cartesian coordinate system may be a right-handed or a left-handed coordinate system.

In the example of FIG. 14, the device 1400 is positioned on a surface 1401 (e.g., a horizontal surface of a table or a desk) that is near a wall outlet 1403 where a power cable 1405 of the device 1400 (e.g., a power adapter or brick) can be plugged into the wall outlet 1403 to power the device 1400, which may include one or more batteries (e.g., one or more rechargeable lithium-ion batteries, etc.).

As shown in FIG. 14, the power cable 1405 is visible through the transparent window 1446 of the display housing 1440 of the device 1400. FIG. 14 shows an example of the mini-display unit 1460 as including an ambient light sensor 1468, which may be utilized to sense ambient light and optionally adjust brightness of the mini-display unit 1460 (e.g., light emitting circuitry of the mini-display unit). As an example, the ambient light sensor 1468 may be utilized to adjust the brightness of the mini-display unit 1460 where, for example, the transparent window 1446 diminishes transmission of light emitted by the mini-display unit 1460. For example, the transparent window 1446 may be tinted such that it blends in with the exterior of the device 1400. In such an example, someone may not readily discern where the transparent window 1446 ends and where, for example, a solid, non-transparent portion of the display housing 1440 begins (e.g., for a sleek look). As such, the tint may be relatively heavy. Where the device 1400 includes the ambient light sensor 1468 positioned to sense light transmitted through the transparent window 1446 to the light sensor 1468, that amount of light may be utilized as a signal to adjust brightness of one or more light emitting circuits of the mini-display unit 1460. For example, in a closed orientation of the device 1400, the brightness may be increased to account for the tint.

As an example, the device 1400 can include an exterior ambient light sensor 1448 (see FIG. 15), which may be utilized to adjust brightness of the mini-display unit 1460. For example, when it is bright outside, and the device 1400 is closed, brightness may be increased to a level that is sufficient to overcome a tint if the transparent window 1446 is tinted and to overcome the bright ambient light and, for example, when it is not bright outside (e.g., in a dark room, on a street at night, in a car at night, etc.), and the device 1400 is closed, the brightness may be adjusted to overcome the tint if the transparent window 1446 is tinted and just sufficient to be visible. When the device 1400 is open, one or both of the sensor 1468 and 1448 (e.g., where at least one is included) may be utilized to adjust brightness, if desired or configured to do so.

As an example, brightness of a mini-display may be automatically adjusted to be increased when a device is in a closed orientation where, for example, a transparent window is tinted such that the brightness is sufficient to visibly comprehend information rendered to the mini-display when the device is in a closed orientation.

As an example, a transparent window can be tinted and, for example, a brightness of a mini-display (e.g., a second display) in a closed, clamshell orientation can be automatically set at a brighter level than a level in an open, clamshell orientation for a given ambient light level.

As an example, the transparent window 1446 may be smaller in area than the mini-display 1464, the transparent window 1446 may be the same area as the mini-display 1464 or the transparent window 1446 may be larger in area than the mini-display 1464. The transparent window 1446 overlaps at least a portion of the mini-display 1464 when the device 1400 is in a closed orientation.

Figure 15:
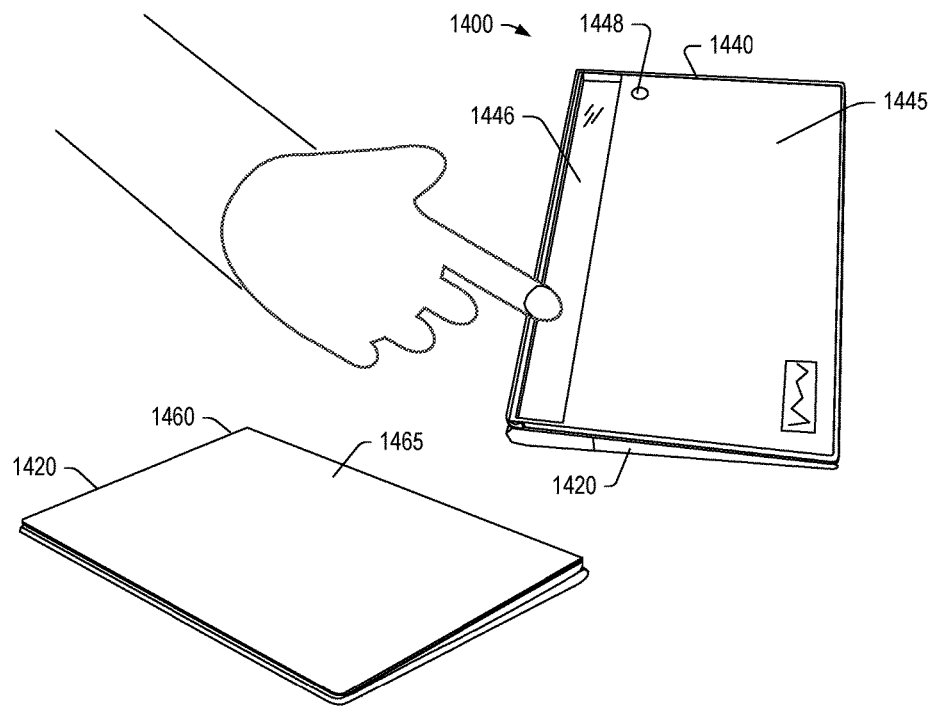
FIG. 15 is a series of views of the device of FIG. 14 in an example orientation and a series of views of information rendered to a display and the information visible through the transparent window.
Figure 15:
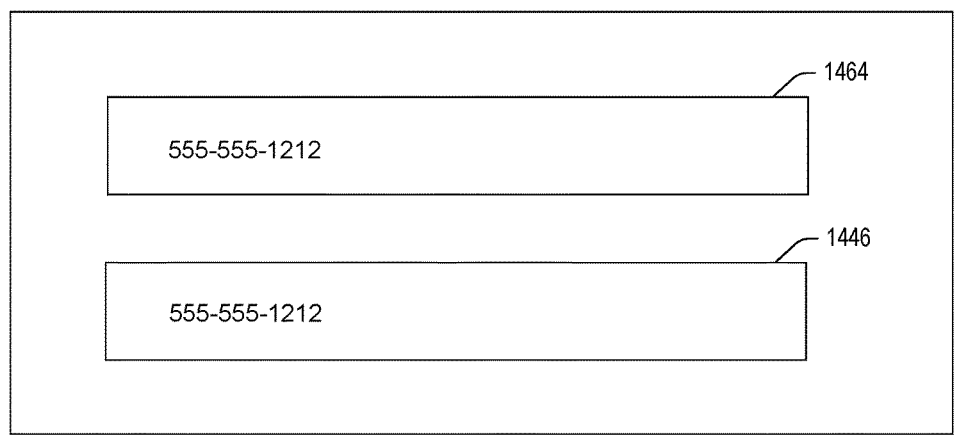

FIG. 15 shows the device 1400 in a closed orientation (e.g., a closed clamshell orientation) where the display housing 1440 includes a back side 1445 where the transparent window 1446 allows for seeing through a portion of the display housing 1440 and, for example, viewing of the mini-display 1464. FIG. 15 shows the mini-display 1464 rendering information (e.g., a phone number, etc.) and the information being viewable through the transparent window 1446.

As an example, the transparent window 1446 may be a touch sensitive window where it can respond to touch by a user's finger or fingers. As an example, such a touch sensitive window may respond to a stylus, optionally a button push of a stylus, etc. As an example, the transparent window 1446 may respond to a voice command, such as "show information", where the window may change state in response to receipt of the voice command by the device 1400.

Figure 16:
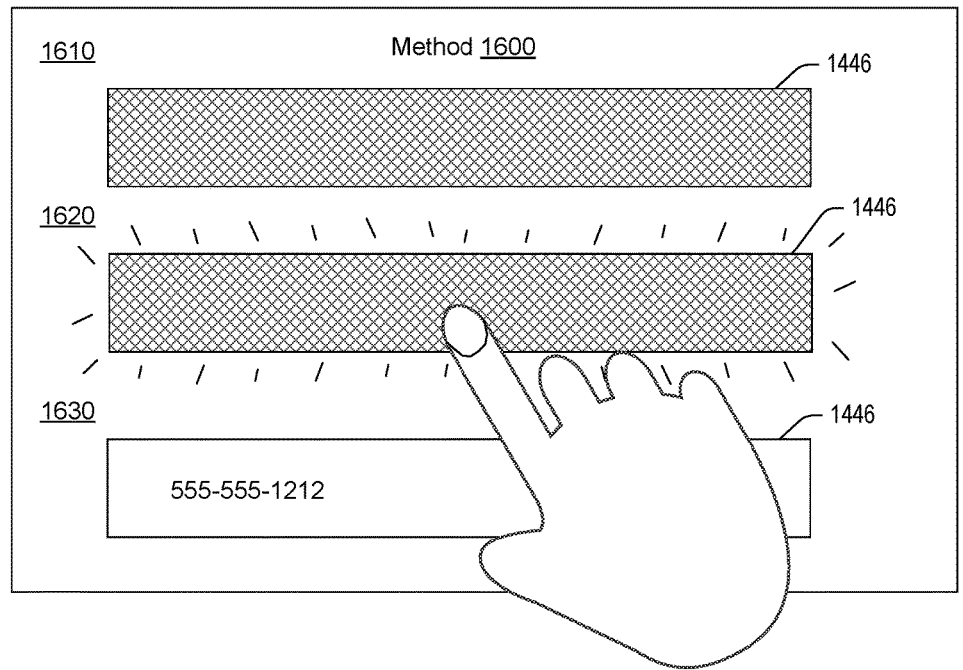
FIG. 16 is a series of views of example states of the device of FIG. 14 and an example of a Fresnel lens that can be part of the device and that can magnify information rendered to a display.
Figure 16:
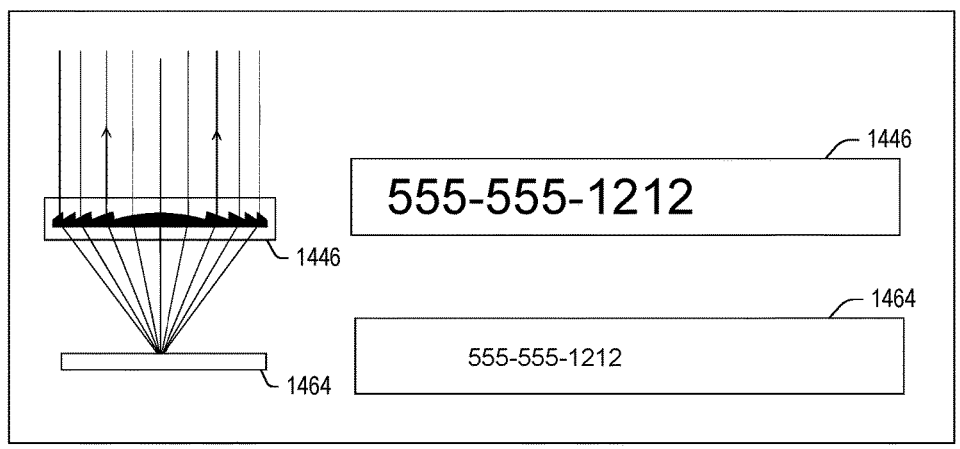

FIG. 16 shows the transparent window 1446 with respect to an example of a method 1600 where the transparent window 1446 can change state (e.g., transition from one state to another state). As shown, the transparent window 1446 can be in an opaque state 1610 and transition to a glowing state 1620 responsive to receiving a notification by the device 1400. The glowing state 1620 can indicate that information can be viewed. In such an example, the transparent window 1446 may transition from the glowing state 1620 to a translucent or transparent state 1630 upon receipt of an instruction from a user. For example, a user may touch the transparent window 1446 in the glowing state to trigger a transition to the state 1630 for viewing of information rendered to the mini-display 1464.

As an example, a glowing state may be a blinking state or other type of state where a user can readily determine that information is available for viewing via a mini-display. As an example, an LED or other light emitting device may be illuminated within or proximate to the transparent window to allow it to glow, blink, etc. As an example, a device can include color coded glowing. For example, email may glow blue while text messaging may glow red. In such an approach a user may determine what type of information is available for viewing prior to making a decision as to whether to view the information.

As an example, a transparent window can include smart glass (e.g., switchable glass) that can change its light transmission properties based on one or more types of external stimuli. Active smart glass may respond to an electrical field and passive smart glass may respond to one or more environmental factors (e.g., heat, UV radiation, etc.). As an example, smart glass may be passive and/or active.

Electrochromic, suspended particle, and liquid crystal are some examples of active smart glass technologies that can respond to an electrically powered field as a stimulus and adjust one or more light transmission properties dynamically. Passive smart glass technologies such as, for example, thermochromic and photochromic, can react to heat or light, respectively.

Electrochromic glass can change light transmission properties in response to voltage. Electrochromic glass can include stacked porous layers printed on top of each other on a substrate modified with a transparent conductor (such as ITO or PEDOT:PSS). In such an example, a printed layer can have a function or functions. As an example, a working electrode can include a positive porous semiconductor (e.g., titanium dioxide, TiO$_2$) with adsorbed chromogens (e.g., one or more different chromogens for different colors). Such chromogens can change color by reduction or oxidation. A passivator can be used as the negative of an image to improve electrical performance. An insulator layer can serve the purpose of increasing contrast ratio and separating a working electrode electrically from a counter electrode. A counter electrode can provide a high capacitance to counterbalances charge inserted/extracted on an SEG electrode (e.g., and help to maintain overall charge neutrality). As an example, a conducting carbon layer may be used as a conductive back contact for a counter electrode. As an example, a porous monolithic structure may be overprinted with a liquid or polymer-gel electrolyte, dried, and then may be incorporated into various encapsulation or enclosures, depending on the application requirements.

Electrochromic glass can be relatively thin (e.g., about 30 microns). Such glass may be switched on by applying an electrical potential to the transparent conducting substrate relative to the conductive carbon layer. Such a process can cause a reduction of viologen molecules (coloration) to occur inside a working electrode. By reversing the applied potential or providing a discharge path, the glass can "bleach". For an electrochromic monolith, a relatively low voltage (e.g., about 1 V) can be used to color or bleach viologens (e.g., consider a small over-potentials to drive the electrochemical reduction of the surface adsorbed viologens/chromogens).

In polymer dispersed liquid crystal glass, liquid crystals can be dissolved or dispersed into a liquid polymer followed by solidification or curing of the polymer. During the change of the polymer from a liquid to solid, the liquid crystals can become incompatible with the solid polymer and form droplets throughout the solid polymer. The curing conditions can affect the size of the droplets that in turn affect the final operating properties of the smart glass. As an example, a liquid mix of polymer and liquid crystals can be placed between two layers of glass or plastic that can include a thin layer of a transparent, conductive material followed by curing of the polymer, thereby forming the basic sandwich structure of the smart glass. In effect, such a structure can be a capacitor.

For liquid crystal smart glass, electrodes from a power supply can be attached to transparent electrodes. With no applied voltage, the liquid crystals can be randomly arranged in droplets, resulting in scattering of light as it passes through the smart glass. This can result in a translucent, "milky white" appearance. When a voltage is applied to the electrodes, the electric field formed between the two transparent electrodes on the glass causes the liquid crystals to align, allowing light to pass through the droplets with very little scattering and resulting in a substantially transparent state. As an example, degree of transparency can be controlled by the applied voltage. Such an approach operates because, at lower voltages, few of the liquid crystals align completely in the electric field and hence a small portion of the light passes through while most of the light is scattered. As voltage is increased, fewer liquid crystals remain out of alignment, resulting in less light being scattered.

In suspended particle glass, a thin film laminate of rod-like nano-scale particles can be suspended in a liquid and placed between two pieces of glass or plastic, or attached to one layer. When no voltage is applied, the suspended particles are randomly organized, thus acting to block and absorb light. Whereas, when voltage is applied, the suspended particles can align and let light pass. As an example, varying the voltage of the film can vary the orientation of the suspended particles, thereby regulating the tint and the amount of light transmitted.

As an example, suspended particle glass may be manually and/or automatically "tuned" to control the amount of light passing through. As an example, smart glass can be controlled through one or more of a variety of techniques, such as, for example, sensors or switches.

As an example, a device may include one or more LED (light-emitting diodes). As an example, a device may include an LED-embedded light film. As an example, a LED embedded film can be a polyester-based translucent and electro-conductive film that can transmit electricity to LEDs and/or other electronic elements on the film.

As an example, a device can include a transparent conducting film. Transparent conducting films (TCFs) can be optically translucent and electrically conductive. As an example, indium tin oxide (ITO) may be included in a TCF and/or one or more other conductors (e.g., another oxide, a conductive polymer, etc.). As an example, a doped metal oxide may use as a transparent conducting layer in an electronic lens.

As an example, a device can include a backlit LCD, an OLED display and/or another type of display. In a backlit LCD and an OLED display, electrical power can generate light. As an example, one or more mechanisms may allow for switching on a light generator (e.g., a manual button, a touchscreen gesture, monitoring motion and/or position, etc.).

FIG. 16 also shows an example of the transparent window 1446 as including a lens such as a Fresnel lens or other type of plano-convex lens. As shown, the information rendered to the mini-display 1464 can be enlarged by a lens of the transparent window 1446. Such a lens may be the transparent window or may be part of the transparent window. As an example, a lens may be part of a transparent window that can change states, which may be from opaque to transparent. As an example, a transparent window may include an adjustable lens that can control magnification of information rendered to a mini-display. As an example, a mini-display may include a light emitter and a lens disposed over the light emitter. For example, the OLED assembly 290 of FIG. 2 may be fit with a lens such as a Fresnel lens or other type of plano-convex lens, which may act to magnify the size of information as generated in the form of light emissions.

As an example, a mini-display may be a single line display that can render a single line of text. In such an example, the text may be magnified by a lens that is disposed in a display housing of a main display of a device, for example, as a transparent window or as part of a transparent window. As an example, a transparent window can be or include a lens that can magnify an image rendered to a portion of a display of a removable tablet of a device. For example, consider a clamshell device with a removable tablet that nests in a keyboard housing where the keyboard housing and/or a main display housing of the clamshell device includes such a transparent window. When the display of the removable tablet is facing up, a portion of the display may be viewable through the transparent window of the main display housing and, when the display of the removable tablet is facing down, a portion of the display may be viewable through the transparent window of the keyboard housing.

As an example, a device can include a keyboard housing with a transparent window that can be or include a lens that can magnify images rendered to a mini-display or to a portion of another type of display such as a display of a removable tablet.

Figure 17:
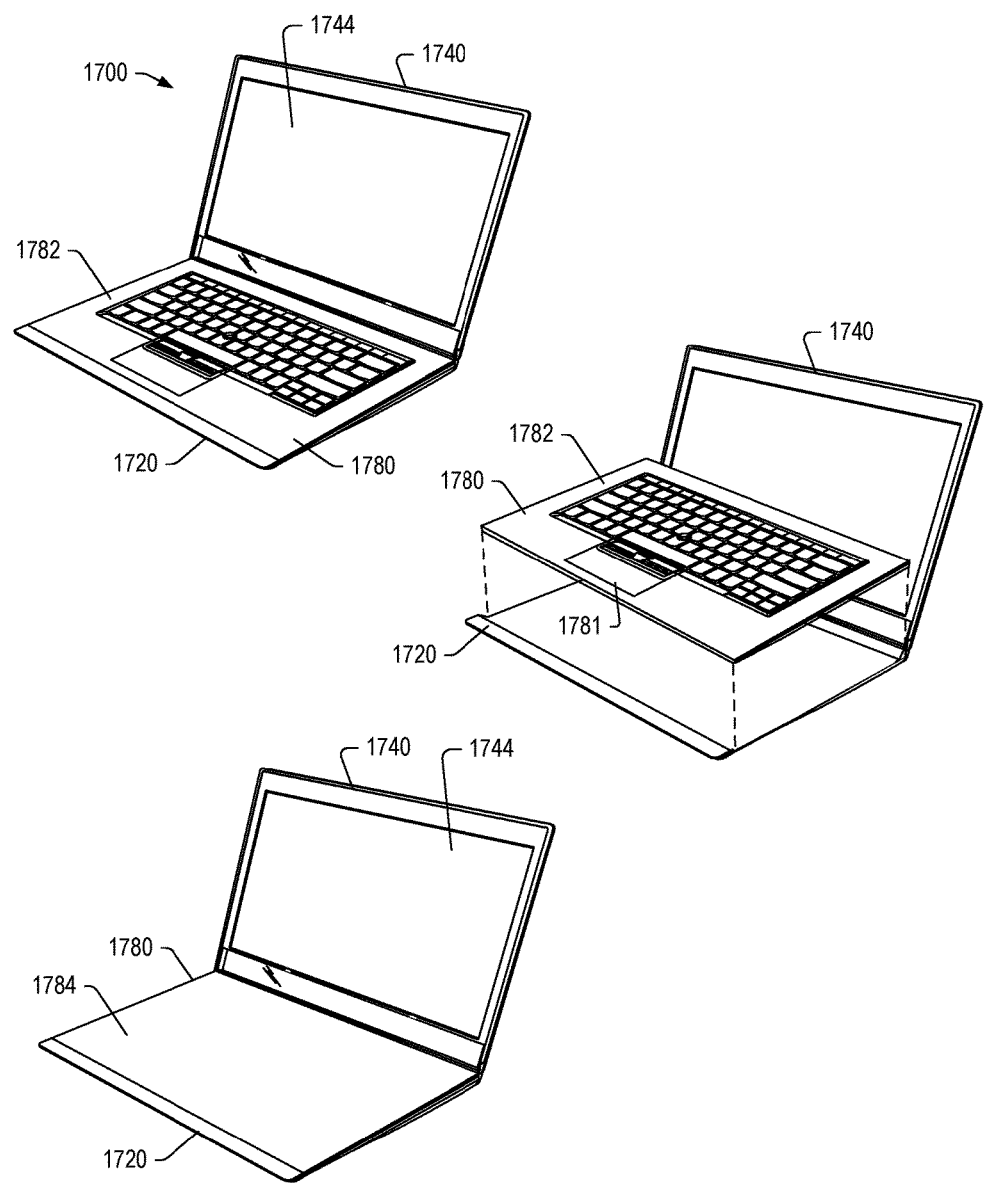
FIG. 17 is a series of views of an example of a device that includes an example of a removable tablet portion.

FIG. 17 shows an example of a device 1700 that includes a keyboard housing 1720, a display housing 1740 with a display 1744 and a removable keyboard 1780 with a touchpad 1781, a keyboard 1782 and a display 1784 where the touchpad 1781 and the keyboard 1782 are on one side of the removable keyboard 1780 and where the display 1784 is on another, opposing side of the removable keyboard 1780. The removable keyboard 1780 includes two, substantially planar and substantially parallel opposing sides where one includes the touchpad 1781 and the keyboard 1782 and where the other includes the display 1784.

As shown in FIG. 17, the removable keyboard 1780 may be lifted from the keyboard housing 1720 (e.g., un-nested) and flipped to orient the keyboard 1782 downwardly. The removable keyboard 1780 may then be seated in the keyboard housing 1720 (e.g., nested) with the display 1784 facing upwardly. In such an example, the display 1744 and the display 1784 can be visible. As an example, the display 1784 can be a touchscreen display that may optionally render a touchable keyboard graphic (e.g., a keyboard GUI) that can allow a user to touch GUI keys and, for example, enter information that may be rendered to the display 1744.

Figure 18:
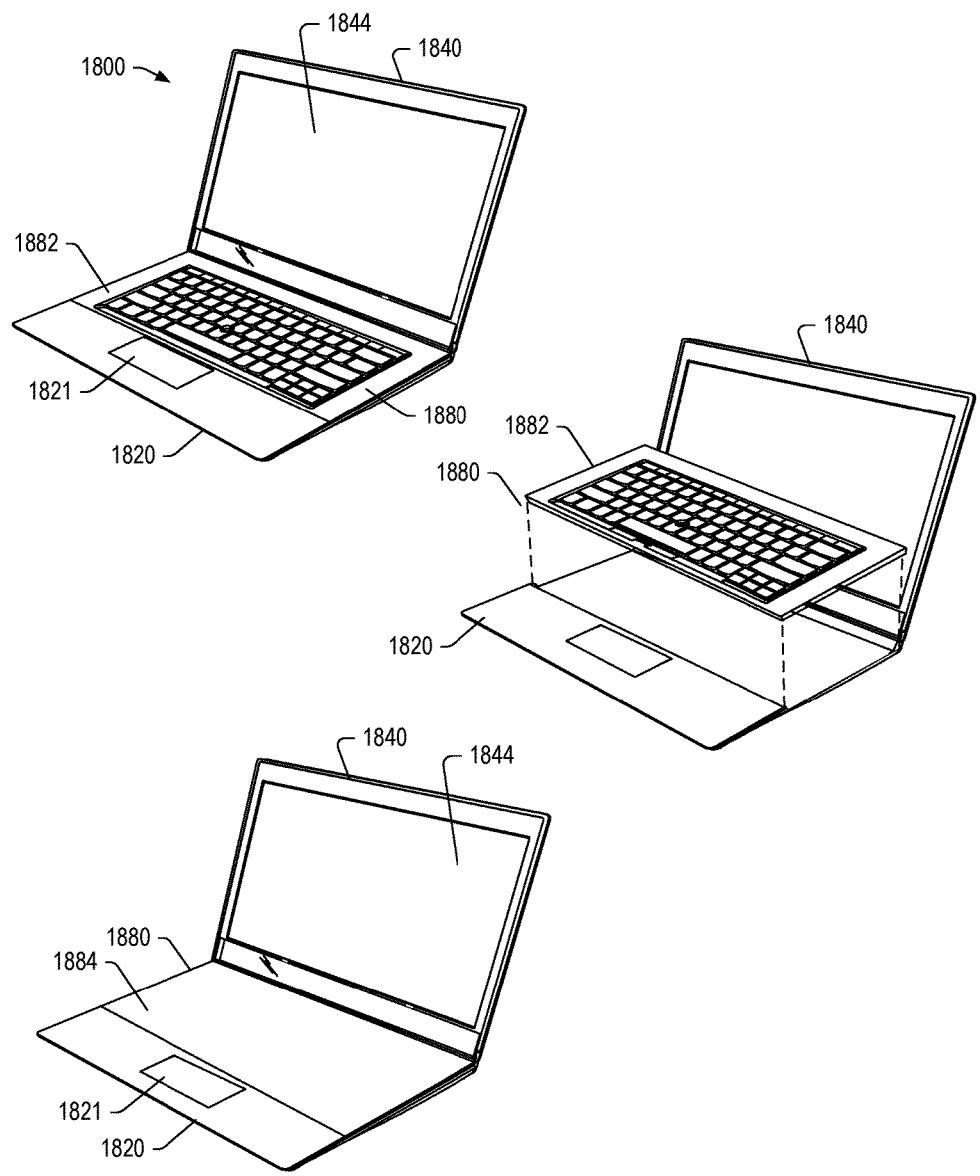
FIG. 18 is a series of views of an example of a device that includes another example of a removable tablet portion.

FIG. 18 shows an example of a device 1800 that includes a keyboard housing 1820 with a touchpad 1821, a display housing 1840 with a display 1844 and a removable keyboard 1880 with a keyboard 1882 and a display 1884 where the keyboard 1882 is on one side of the removable keyboard 1880 and where the display 1884 is on another, opposing side of the removable keyboard 1880. The removable keyboard 1880 includes two, substantially planar and substantially parallel opposing sides where one includes the keyboard 1882 and where the other includes the display 1884.

As shown in FIG. 18, the removable keyboard 1880 may be lifted from the keyboard housing 1820 (e.g., un-nested) and flipped to orient the keyboard 1882 downwardly. The removable keyboard 1880 may then be seated in the keyboard housing 1820 (e.g., nested) with the display 1884 facing upwardly. In such an example, the display 1844 and the display 1884 can be visible. As an example, the display 1884 can be a touchscreen display that may optionally render a touchable keyboard graphic (e.g., a keyboard GUI) that can allow a user to touch GUI keys and, for example, enter information that may be rendered to the display 1844.

As an example, the touchpad 1821 may be operable in one or more touchpad modes. For example, consider a mode to navigate information on the display 1844, a mode to navigate information on the display 1884 and/or a mode to navigate information on the display 1844 and the display 1884. As an example, the mode of the touchpad 1821 of the keyboard housing 1820 may be automatically set depending on the orientation of the removable keyboard 1880 with respect to the keyboard housing 1820.

As an example, the touchpad 1821 may include a remote mode where information may be navigated on the display 1884 even when the removable keyboard 1880 is not nested in the keyboard housing 1820. For example, consider a tablet mode of the removable keyboard 1880 where a user may position the removable keyboard 1880 separate from the keyboard housing 1820 by a distance (e.g., 5 cm or greater) and where wireless communication may exist between the touchpad 1821 of the keyboard housing 1820 and the removable keyboard 1880 to allow for use of the touchpad 1821 to navigate information rendered to the display of the removable keyboard 1880.

As an example, a touchpad mode may allow for navigation of information rendered to the display 1844 when the removable keyboard 1880 is not nested in the keyboard housing 1820 of the device 1800.

Figure 19:
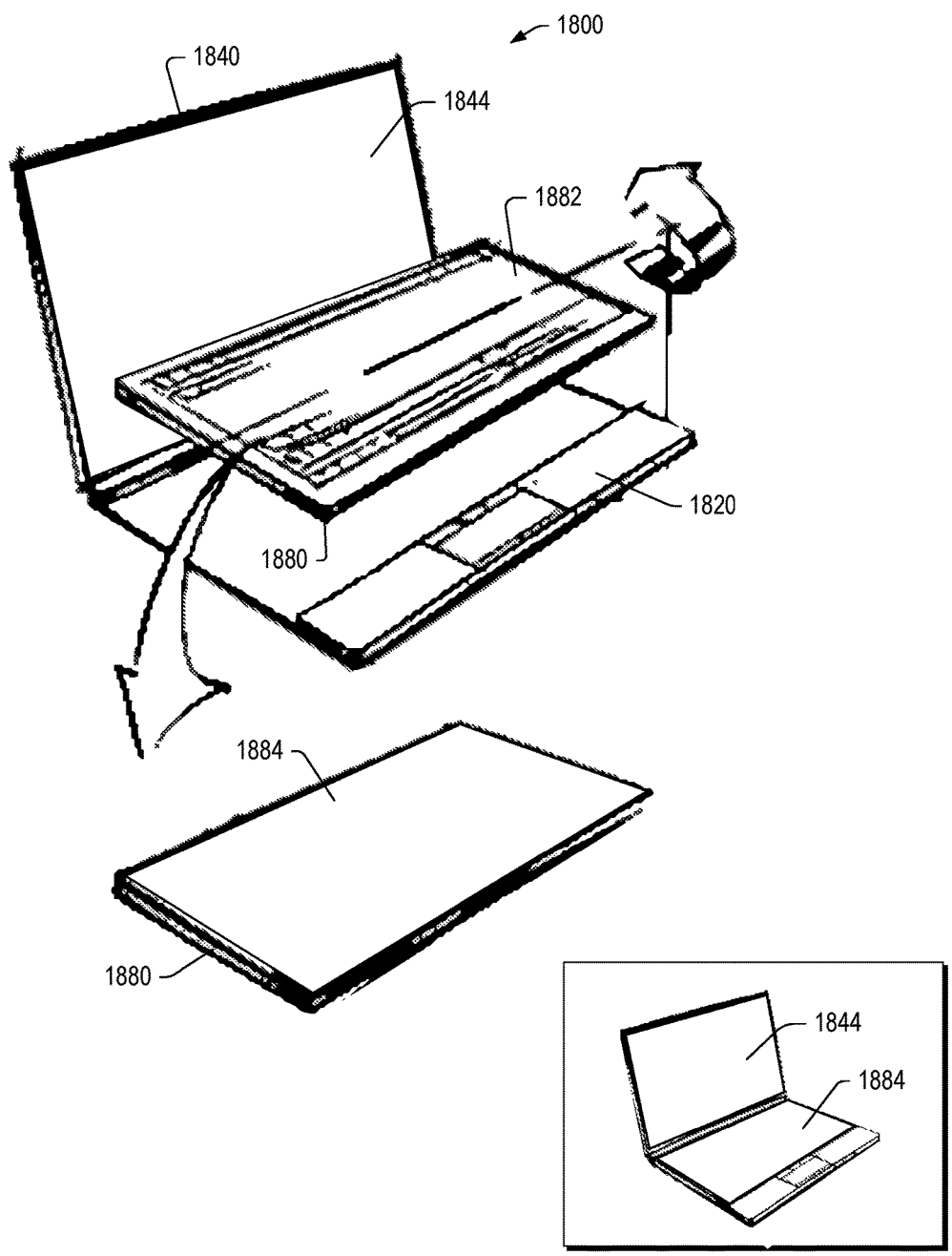
FIG. 19 is a series of views of the device of FIG. 18.

FIG. 19 shows the device 1800 in various orientations, which include a transitional orientation. An arrow indicates flipping of the removable keyboard 1880, which may be referred to as a removable tablet.

Figure 20:
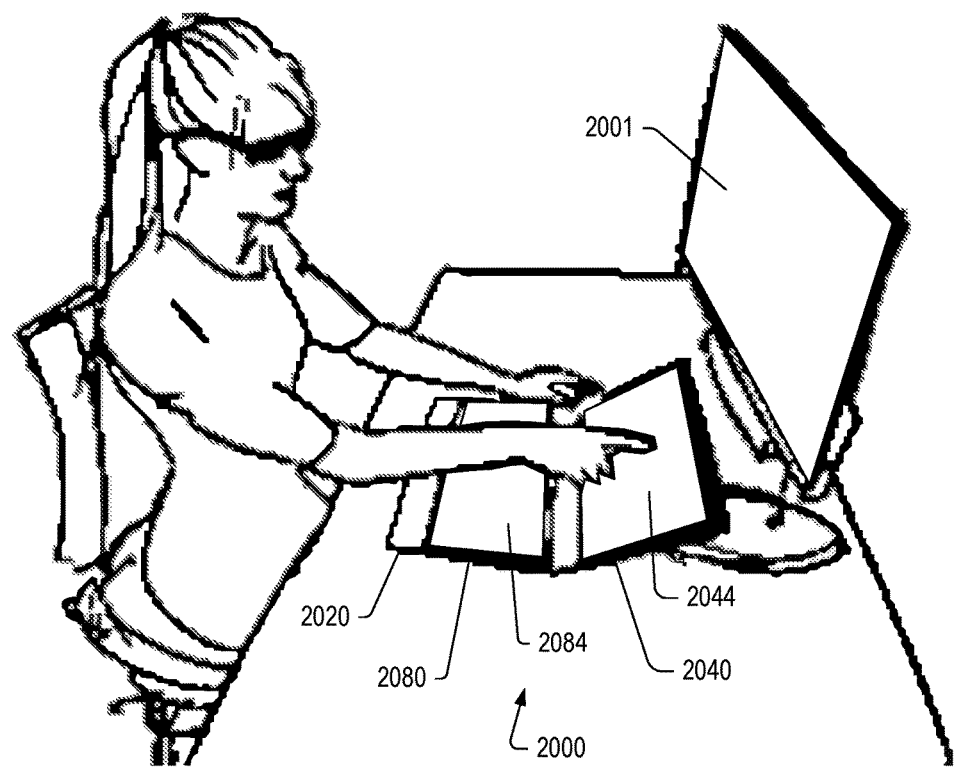
FIG. 20 is an example of a use scenario.

FIG. 20 shows an example of a scenario with an example of a multiple display device 2000 that is being utilized in combination with a large display 2001 where the device 2000 includes a keyboard housing 2020, a display housing 2040 with a display 2044 and a removable tablet 2080 with a display 2084 where the removable tablet 2080 is nested in the keyboard housing 2020. In such an example, a user may utilize all three displays as being operatively coupled to the device 2000.

Figure 21:
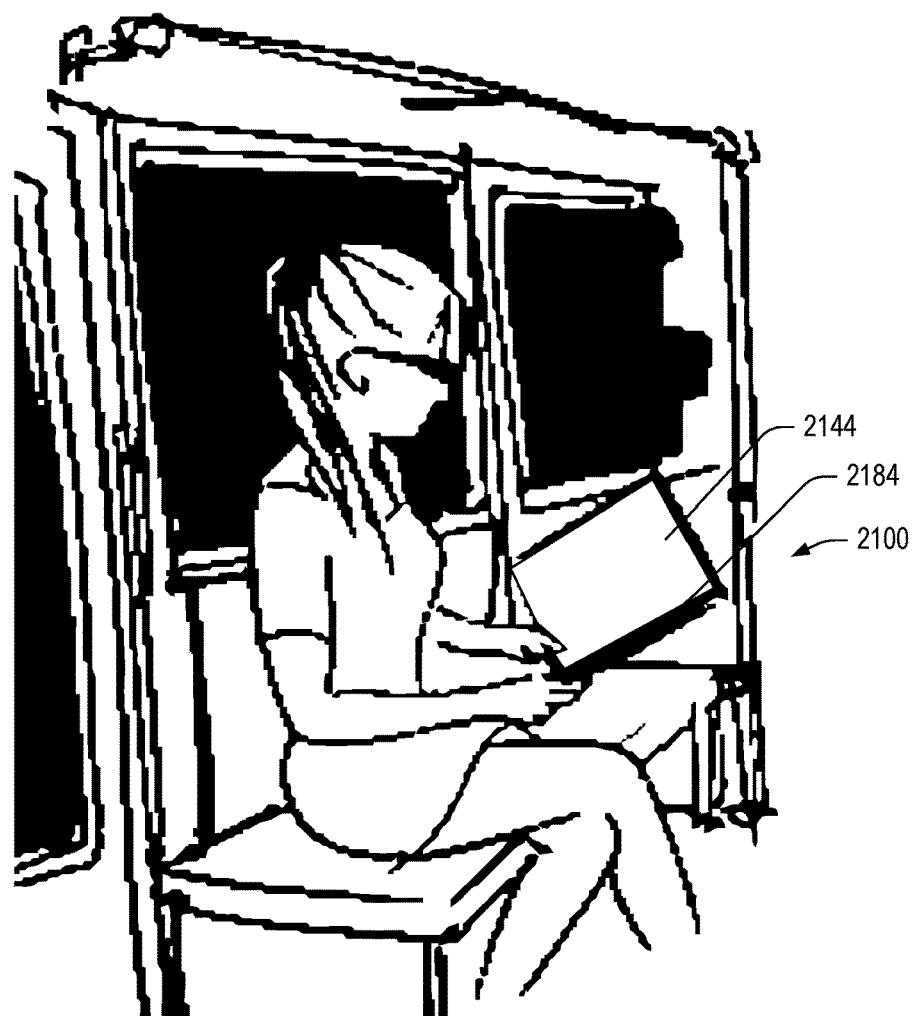
FIG. 21 is an example of a use scenario.
Figure 21:
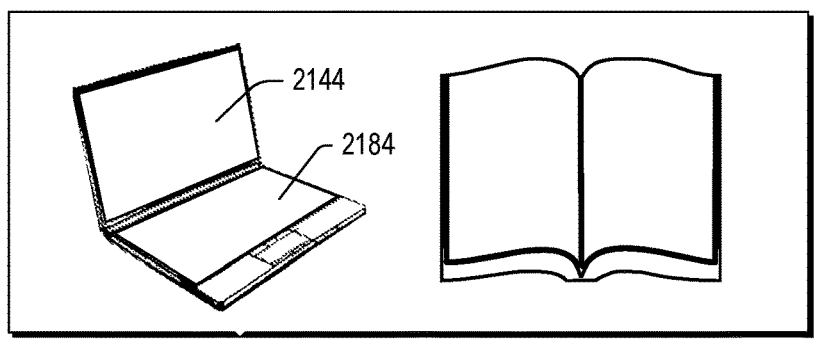

FIG. 21 shows an example of a scenario with an example of a multiple display device 2100 that includes displays 2144 and 2184 in a portrait arrangement as akin to opposing pages of an open book. Such an arrangement may allow a user to have a book-like experience when consuming information rendered to the displays 2144 and 2184.

Figure 22:
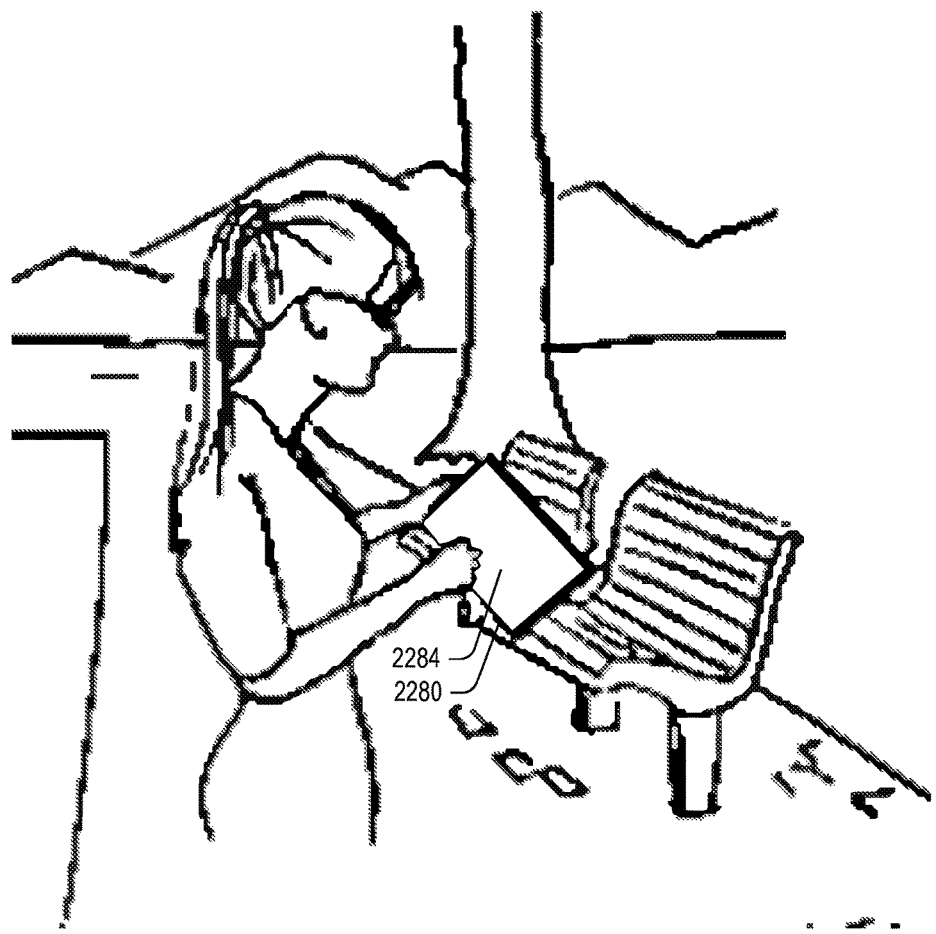
FIG. 22 is an example of a use scenario.

FIG. 22 shows an example of a scenario with an example of a portion of a multiple display device, particularly a removable keyboard 2280 that includes a display 2284, where the opposing side includes a keyboard as in, for example, FIG. 17 or FIG. 18.

Figure 23:
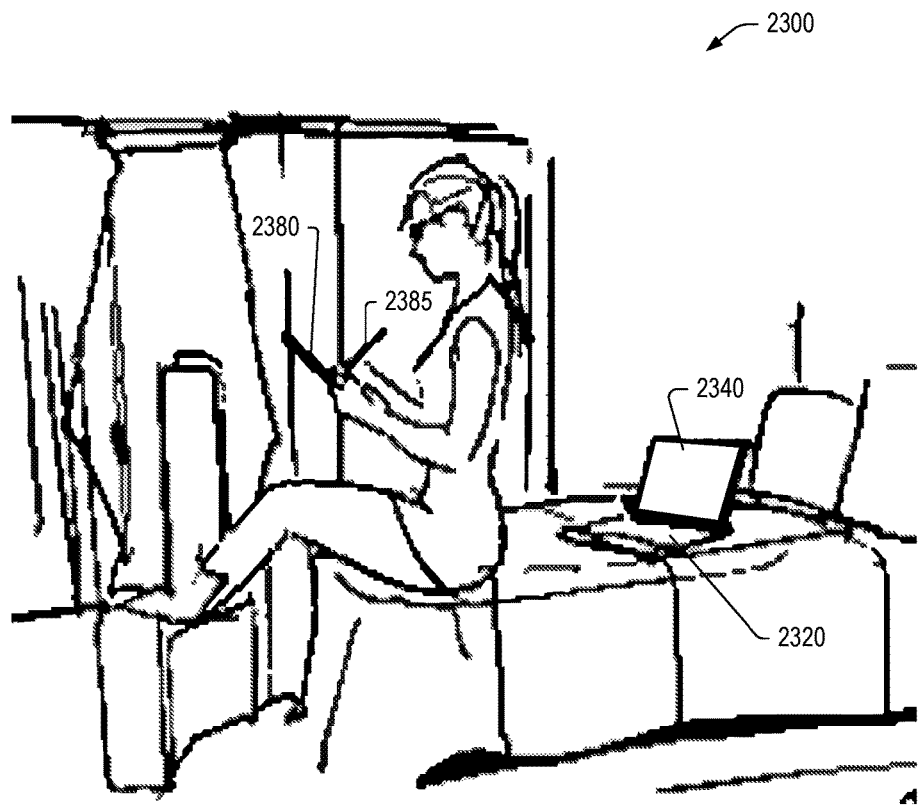
FIG. 23 is an example of a use scenario.

FIG. 23 shows an example of a scenario with an example of a multiple display device 2300 that includes a keyboard housing 2320, a display housing 2340 and a removable tablet 2380 that may be optionally seated with respect to the keyboard housing 2320. As shown, a user has removed the removable tablet 2380 from the device 2300 where the removable tablet 2380 can include a display side and a keyboard side. As shown, the user has a stylus 2385 in a hand. The removable tablet 2380 may optionally include digitizer circuitry that can interact with a stylus, which may be an active stylus (e.g., battery powered, EM powered, etc.) or a passive stylus.

Figure 24:
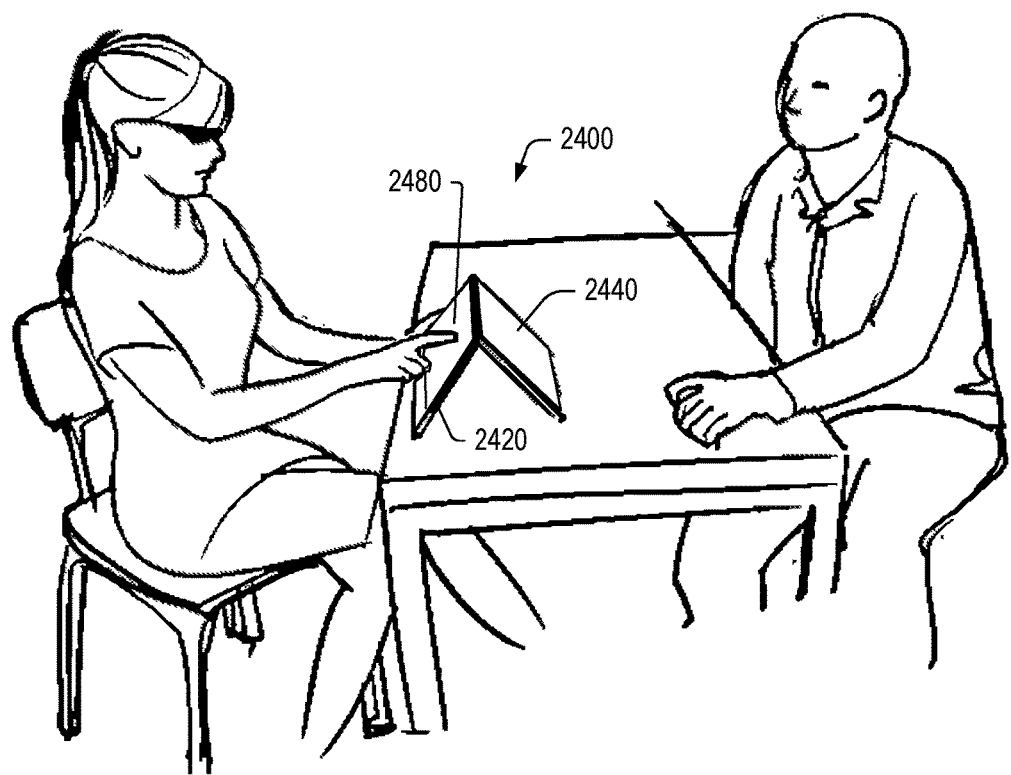
FIG. 24 is an example of a use scenario.

FIG. 24 shows an example of a scenario with an example of a multiple display device 2400 that includes a keyboard housing 2420, a display housing 2440, and a removable tablet 2480. As shown, the device 2400 is in a tent orientation where a display of the display housing 2440 faces one person and where a display of the removable tablet 2480 faces another person. As an example, one person may be watching videos and the other doing work. Or, for example, one person may be making a presentation that is being viewed by the other person. Or, for example, the two people may be playing an interactive game. In such an example, the people may interact with the device 2400 optionally via touch where the device 2400 include multiple touchscreen displays.

As an example, an apparatus can include a processor; memory accessible by the processor; a first housing that includes a first display operatively coupled to the processor; a second housing that includes a keyboard, a second display and a detachable pointing device adjacent to the second display; and a hinge assembly that operatively couples the first housing to the second housing. In such an example, the first display may be a main display and the second display may be a mini-display. In such an example, the first housing can include a transparent window where, for example, in a closed, clamshell orientation of the first housing and the second housing, the second display, which may be a mini-display, and the transparent window overlap at least in part widthwise and depthwise.

As an example, a second display of a device, which may be a mini-display, may be adjustable with respect to a keyboard of a keyboard housing of the device. As an example, the second display may be disposed depthwise between an uppermost row of keys of a keyboard of a keyboard housing and an end of the keyboard housing where the end may be a hinged end that is operatively coupled to a display housing of a first display of a display housing.

As an example, a keyboard can define a keyboard plane where a second display is substantially planar and adjustable between the keyboard plane and an angled viewing plane. For example, the second display, which can be a mini-display, may be tiltable via one or more mechanisms (e.g., hinges, etc.).

As an example, a detachable pointing device can include a battery. As an example, a detachable pointing device can include a rechargeable battery where a second housing of a device (e.g., a keyboard housing), which includes a first housing (e.g., a display housing), can include a charging port for charging the rechargeable battery. For example, a keyboard housing of a clamshell device may include a charging port. In such an example, the charging port may be part of a second display operatively coupled to the keyboard housing. Such a display may be a display unit that includes a display portion to which information may be rendered using display circuitry.

As an example, a detachable pointing device can be a mouse. As an example, a detachable pointing device can include communication circuitry. In such an example, the detachable pointing device can include a wired cord where the communication circuitry can be wired communication circuitry. Or, for example, communication circuitry can be wireless communication circuitry and a detachable pointing device may be corded or uncorded. As an example, a cord may be an attachment feature that may help prevent the detachable pointing device from becoming lost. For example, a cord may be a leash, with or without electrical wire or wires that are utilized for power and/or information.

As an example, a second display, which may be a mini-display, or a device can be operatively coupled to wireless communication circuitry. For example, the second display can be operatively coupled to wireless communication circuitry to render information transmitted via a cellular phone to the wireless communication circuitry of the second display. In such an example, a mini-display can render information generated and/or received by a cellular phone.

As an example, a second display, which can be a mini-display of a clamshell device, may be operable in a low power state where a first display of the clamshell device is powered off. For example, consider a laptop computer with a keyboard housing with a mini-display and a display housing with the main display where in a scenario where the main display is powered off, the mini-display may be in a low power state such that information received by the laptop computer may be rendered to the mini-display. As an example, a second display may be operable to render information communicated to a device via a network interface, optionally when the device is in a low power state (e.g., a sleep state, a hibernate state, etc.). As an example, a device can include one or more network interfaces, which may be or include one or more short-range wireless network interfaces. As an example, a device can include a cellular network interface, a satellite network interface, a WiFi network interface, a BLUETOOTH® network interface (e.g., a piconetwork interface), etc.

As an example, an apparatus can include a processor; memory accessible by the processor; wireless communication circuitry operatively coupled to the processor; a first housing that includes a first display operatively coupled to the processor; a second housing that includes a keyboard and a second display where the second display is tiltable with respect to a plane of the keyboard; and a hinge assembly that operatively couples the first housing to the second housing. In such an example, the second housing can include a recess that seats the second display substantially in the plane of the keyboard. In such an example, the first housing and second housing can have a closed, clamshell orientation where the second display is seated in the recess and, for example, the apparatus can include a tilt mechanism that unseats the second display from the recess responsive to a transition of the apparatus from the closed, clamshell orientation to an open, clamshell orientation. In such an example, a tilt mechanism may be or include a hinge mechanism, which may include a biased hinge and/or, for example, may include one or more biasing mechanisms such as, for example, one or more springs.

As an example, a mini-display, which may be a second display can include a magnifying lens. For example, consider a Fresnel lens or another type of plano-convex lens.

As an example, an apparatus can include a processor; memory accessible by the processor; a first housing that includes a first display operatively coupled to the processor and a transparent window; a second housing that includes a keyboard and a second display; and a hinge assembly that operatively couples the first housing to the second housing to transition from a closed, clamshell orientation to an open, clamshell orientation where, in the closed, clamshell orientation, the transparent window overlays at least a portion of the second display. In such an example, the overlay can be at least a portion widthwise (e.g., y-direction) and at least a portion depthwise (e.g., x-direction), for example, as shown in the example of FIG. 14.

As an example, a transparent window can include a magnifying lens, which may be, for example, a Fresnel lens or another type of plano-convex lens. As an example, a transparent window can include a touch sensitive surface. For example, in a closed, clamshell orientation of a clamshell device, the touch sensitive surface can be in an operational state and a second display of the clamshell device (e.g., a mini-display) can be in an operational state. In such an example, touch input received via the touch sensitive surface may optionally be mapped to the second display. For example, a user may touch a region on the transparent window and that touch may be mapped to a region on the second display as if the user were actually touching the second display, which may be a mini-display. In such an example, a touch may be received as a signal via touch sensing circuitry and communicate to one or more processors and/or one or more other touch sensing circuitries to register the touch via the transparent window. In such an example, where the transparent window includes a magnifying lens, the mapping may account for magnification such that touching of the transparent window is scaled to a region of the second display. As an example, a second display may be touch insensitive and a transparent window may be touch sensitive or vice versa.

As an example, a transparent window can include an opaque state and a transparent state. In such an example, a device can include circuitry that transitions the transparent window from the opaque state to the transparent state and that transitions the transparent window from the transparent state to the opaque state.

As an example, a transparent window may be tinted such that a mini-display, as a second display of a device, is not readily visible unless the mini-display emits light. For example, a mini-display may be an OLED display with adjustable brightness. In such an example, when a device is in a closed orientation (e.g., a closed clamshell), the OLED display, when called to render information, may do so at a brightness level that may be greater than a brightness level when the device is in an open orientation (e.g., an open clamshell). In such an approach, the brightness level may be adjusted to account for the tint of the transparent window (e.g., consider a gray tint, a black tint, or other type of tint). As an example, a mini-display unit may include a sensor that can sense ambient light. In such an example, the mini-display As an example, a transparent window can include circuitry that responds to touch input. As an example, a mini-display can include circuitry that responds to touch. As an example, a second display, which can be a mini-display, can be operatively coupled to wireless communication circuitry. In such an example, the second display can be operatively coupled to wireless communication circuitry to render information transmitted via a cellular phone to the wireless communication circuitry. As an example, a second display may be operable in a low power state where a first display is powered off. In such an example, the second display can be operable to render information communicated to an apparatus via a network interface where, for example, the network interface may optionally be a short-range wireless network interface.

As an example, an apparatus can include a removable tablet that includes a keyboard and a corresponding keyboard side and a display side with a second display. In such an example, the removable tablet can include a keyboard orientation and a display orientation with respect to a second housing of a clamshell device that includes a first housing and the second housing operatively coupled via one or more hinge mechanisms. As an example, in a closed, clamshell orientation, for the display orientation of the removable tablet with respect to the keyboard housing, a transparent window can overlay at least a portion of the second display.

As an example, a removable tablet may be operable independent of a keyboard housing of a clamshell device. As an example, a clamshell device with a removable tablet can include a book orientation of a first display (e.g., a main display) and a second display (e.g., a tablet display) where information from a common file is rendered to the first display and the second display in portrait mode.

As an example, a clamshell device can include a tent orientation of a first display (e.g., a main display) and a second display (e.g., a tablet display) where information from a common file is rendered to the first display and the second display in landscape mode.

As an example, a planar orientation of a clamshell device with a first display (e.g., a main display) and a second display (e.g., a tablet display) can provide for information from a common file rendered to an extent that includes at least a portion of the first display and at least a portion of the second display.

As an example, a removable tablet can include a first side with a keyboard and with a display, which can be a mini-display. For example, a removable tablet can include multiple display assemblies where at least one is a mini-display assembly. For example, consider one or more of the OLED display assemblies 290 of FIG. 2 being disposed adjacent to an uppermost row of keys of a keyboard of a removable tablet where the removable tablet includes a larger display on an opposing side.

As an example, a device with a first display in a display housing with a transparent window can include a keyboard housing with a removable tablet that can include a first side with a keyboard and a second display and a second side with a third display. In such an example, a transparent window can overlay at least a portion of the second display in a first orientation of the removable tablet seated in the keyboard housing and the transparent window can overlay at least a portion of the third display in a second orientation of the removable tablet seated in the keyboard housing.

As an example, a device can include an orientation sensor that detects the orientation of a removable tablet as seated in a keyboard housing. As an example, a keyboard housing can include a transparent window. In such an example, a display or a portion of a display may be visible through the transparent window. In such an example, where a device may be in a closed clamshell orientation where at least one display is visible through at least one transparent window, for example, when the at least one display emits light.

As an example, a device can include a display interface port operatively coupled to a processor where at least one of a first display and a second display is a touchscreen display that includes touch input circuitry operatively coupled to the processor.

As an example, a first housing can be a display housing and/or a second housing can be a keyboard housing. Such housings can include one or more electronic components, which may be operatively coupled to at least one processor, which may be via wire, wires and/or wireless circuitry.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory chip, a memory card, a storage disk, etc.) and referred to as a computer-readable storage medium, which is non-transitory and not a signal or a carrier wave.

Figure 25:
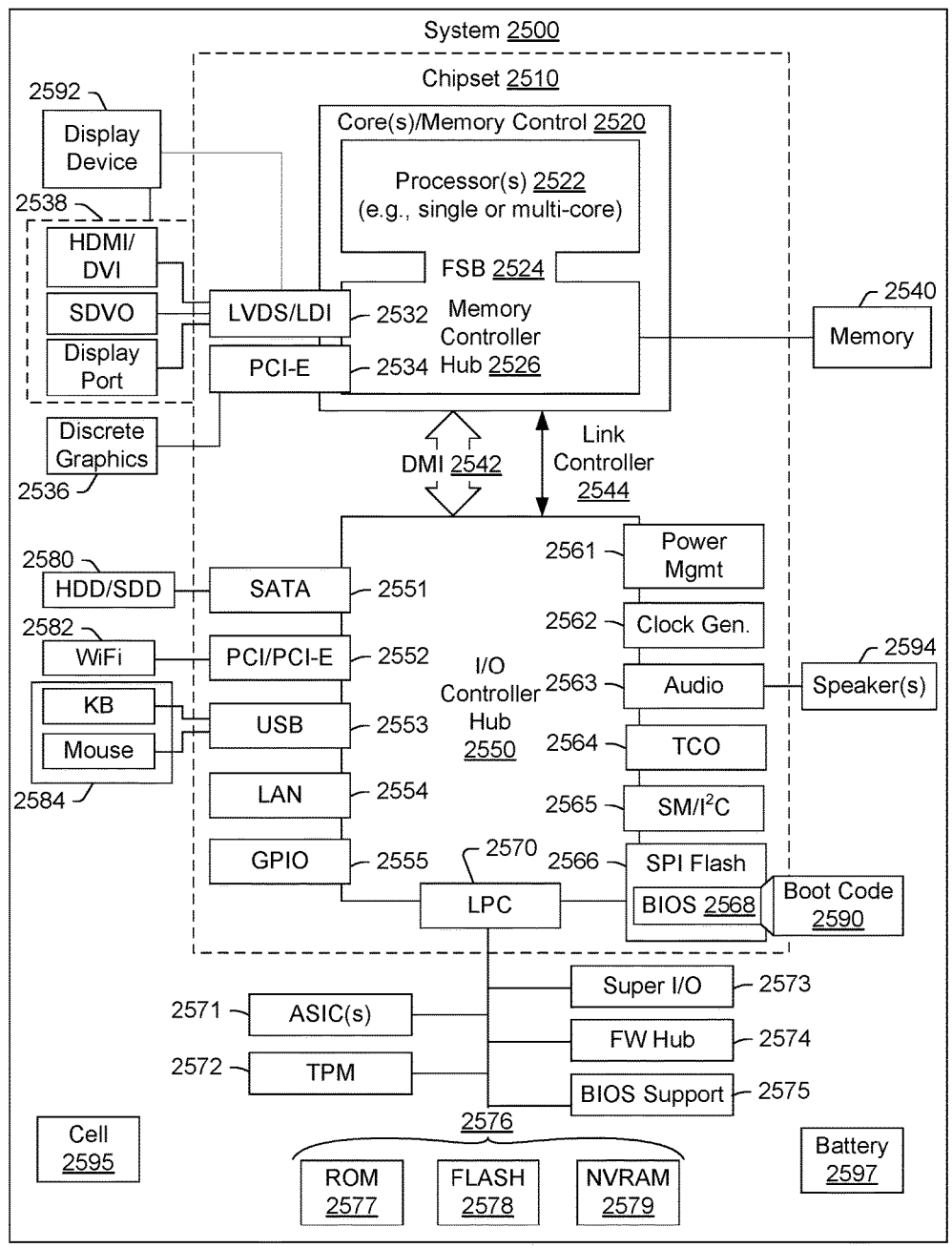
FIG. 25 is a diagram of an example of a system that includes one or more processors.

While various examples of circuits or circuitry have been discussed, FIG. 25 depicts a block diagram of an illustrative computer system 2500. The system 2500 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a satellite, a base, a server or other machine may include other features or only some of the features of the system 2500.

As shown in FIG. 25, the system 2500 includes a so-called chipset 2510. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 25, the chipset 2510 has a particular architecture, which may vary to some extent depending on brand or manufacturer. The architecture of the chipset 2510 includes a core and memory control group 2520 and an I/O controller hub 2550 that exchange information (e.g., data, signals, commands, etc.) via, for example, a direct management interface or direct media interface (DMI) 2542 or a link controller 2544. In the example of FIG. 25, the DMI 2542 is a chip-to-chip interface (sometimes referred to as being a link between a "northbridge" and a "southbridge").

The core and memory control group 2520 include one or more processors 2522 (e.g., single core or multi-core) and a memory controller hub 2526 that exchange information via a front side bus (FSB) 2524. As described herein, various components of the core and memory control group 2520 may be integrated onto a single processor die, for example, to make a chip that supplants the conventional "northbridge" style architecture.

The memory controller hub 2526 interfaces with memory 2540. For example, the memory controller hub 2526 may provide support for DDR SDRAM memory (e.g., DDR, DDR2, DDR3, etc.). In general, the memory 2540 is a type of random-access memory (RAM). It is often referred to as "system memory".

The memory controller hub 2526 further includes a low-voltage differential signaling interface (LVDS) 2532. The LVDS 2532 may be a so-called LVDS Display Interface (LDI) for support of a display device 2592 (e.g., a CRT, a flat panel, a projector, etc.). A block 2538 includes some examples of technologies that may be supported via the LVDS interface 2532 (e.g., serial digital video, HDMI/DVI, display port). The memory controller hub 2526 also includes one or more PCI-express interfaces (PCI-E) 2534, for example, for support of discrete graphics 2536. Discrete graphics using a PCI-E interface has become an alternative approach to an accelerated graphics port (AGP). For example, the memory controller hub 2526 may include a 16-lane (x16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 2550 includes a variety of interfaces. The example of FIG. 25 includes a SATA interface 2551, one or more PCI-E interfaces 2552 (optionally one or more legacy PCI interfaces), one or more USB interfaces 2553, a LAN interface 2554 (more generally a network interface), a general purpose I/O interface (GPIO) 2555, a low-pin count (LPC) interface 2570, a power management interface 2561, a clock generator interface 2562, an audio interface 2563 (e.g., for speakers 2594), a total cost of operation (TCO) interface 2564, a system management bus interface (e.g., a multi-master serial computer bus interface) 2565, and a serial peripheral flash memory/controller interface (SPI Flash) 2566, which, in the example of FIG. 25, includes BIOS 2568 and boot code 2590. With respect to network connections, the I/O hub controller 2550 may include integrated gigabit Ethernet controller lines multiplexed with a PCI-E interface port. Other network features may operate independent of a PCI-E interface.

The interfaces of the I/O hub controller 2550 provide for communication with various devices, networks, etc. For example, the SATA interface 2551 provides for reading, writing or reading and writing information on one or more drives 2580 such as HDDs, SDDs or a combination thereof. The I/O hub controller 2550 may also include an advanced host controller interface (AHCI) to support one or more drives 2580. The PCI-E interface 2552 allows for wireless connections 2582 to devices, networks, etc. The USB interface 2553 provides for input devices 2584 such as keyboards (KB), one or more optical sensors, mice and various other devices (e.g., microphones, cameras, phones, storage, media players, etc.). On or more other types of sensors may optionally rely on the USB interface 2553 or another interface (e.g., I²C, etc.). As to microphones, the system 2500 of FIG. 25 may include hardware (e.g., audio card) appropriately configured for receipt of sound (e.g., user voice, ambient sound, etc.).

In the example of FIG. 25, the LPC interface 2570 provides for use of one or more ASICs 2571, a trusted platform module (TPM) 2572, a super I/O 2573, a firmware hub 2574, BIOS support 2575 as well as various types of memory 2576 such as ROM 2577, Flash 2578, and non-volatile RAM (NVRAM) 2579. With respect to the TPM 2572, this module may be in the form of a chip that can be used to authenticate software and hardware devices. For example, a TPM may be capable of performing platform authentication and may be used to verify that a system seeking access is the expected system.

The system 2500, upon power on, may be configured to execute boot code 2590 for the BIOS 2568, as stored within the SPI Flash 2566, and thereafter processes data under the control of one or more operating systems and application software (e.g., stored in system memory 2540). An operating system may be stored in any of a variety of locations and accessed, for example, according to instructions of the BIOS 2568. Again, as described herein, a satellite, a base, a server or other machine may include fewer or more features than shown in the system 2500 of FIG. 25. Further, the system 2500 of FIG. 25 is shown as optionally include cell phone circuitry 2595, which may include GSM, CDMA, etc., types of circuitry configured for coordinated operation with one or more of the other features of the system 2500. Also shown in FIG. 25 is battery circuitry 2597, which may provide one or more battery, power, etc., associated features (e.g., optionally to instruct one or more other components of the system 2500). As an example, a SMBus may be operable via a LPC (see, e.g., the LPC interface 2570), via an I²C interface (see, e.g., the SM/I²C interface 2565), etc.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. An apparatus comprising:
   a processor;
   memory accessible by the processor;
   a first housing that comprises a first display operatively coupled to the processor;
   a second housing that comprises a keyboard, a second display, a detachable pointing device adjacent to the second display, and display circuitry that can receive information and render information to the second display; and
   a hinge assembly that operatively couples the first housing to the second housing,
   wherein, in a physically coupled state of the second display and the detachable pointing device, the second display and the detachable pointing device comprise a tilted state defined by an angle with respect to a plane defined by the keyboard of the second housing, wherein the detachable pointing device is detachable in the tilted state.

2. The apparatus of claim 1 wherein the detachable pointing device comprises a battery.

3. The apparatus of claim 1 wherein the detachable pointing device comprises a rechargeable battery and wherein the second housing comprises a charging port for charging the rechargeable battery.

4. The apparatus of claim 1 wherein the detachable pointing device is a mouse.

5. The apparatus of claim 1 wherein the first housing comprises a transparent window.

6. The apparatus of claim 5 wherein, in a closed, clamshell orientation of the first housing and the second housing, the second display and the transparent window overlap at least in part widthwise and depthwise.

7. The apparatus of claim 1 wherein the detachable pointing device comprises communication circuitry.

8. The apparatus of claim 7 wherein the detachable pointing device comprises a cord.

9. The apparatus of claim 7 wherein the communication circuitry comprises wireless communication circuitry.

10. The apparatus of claim 1 wherein the second display is operatively coupled to wireless communication circuitry.

11. The apparatus of claim 10 wherein the second display is operatively coupled to wireless communication circuitry to render information transmitted via a cellular phone to the wireless communication circuitry.

12. The apparatus of claim 11 wherein the second display is operable in a low power state wherein the first display is powered off.

13. The apparatus of claim 12 wherein the second display is operable to render information communicated to the apparatus via a network interface.

14. The apparatus of claim 13 wherein the network interface comprises a short-range wireless network interface.

15. An apparatus comprising:
a processor;
memory accessible by the processor;
wireless communication circuitry operatively coupled to the processor;
a first housing that comprises a first display operatively coupled to the processor;
a second housing that comprises a keyboard, a second display, and display circuitry that can receive information and render information to the second display, wherein the second housing comprises a recess that seats the second display substantially in the plane of the keyboard and wherein the second display is tiltable from being seated in the recess to form an angle with respect to a plane of the keyboard; and
a hinge assembly that operatively couples the first housing to the second housing.

16. The apparatus of claim 15 wherein the second display comprises a magnifying lens.

17. The apparatus of claim 15 comprising a second display icon rendered to the first display wherein dropping of an item on the second display icon causes rendering of that item to the second display.

18. The apparatus of claim 15 wherein the first housing and second housing comprise a closed, clamshell orientation wherein the second display is seated in the recess.

19. The apparatus of claim 18 comprising a tilt mechanism that unseats the second display from the recess responsive to a transition of the apparatus from the closed, clamshell orientation to an open, clamshell orientation.

* * * * *